(12) United States Patent
Kerr et al.

(10) Patent No.: US 8,329,244 B2
(45) Date of Patent: *Dec. 11, 2012

(54) FRIABLE, BAKED POTATO PIECES AND PROCESS

(75) Inventors: John C. Kerr, Pocatello, ID (US);
Pajaree T. Lynn, Pocatello, ID (US)

(73) Assignee: Nonpareil CorporationID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/184,027

(22) Filed: Jul. 15, 2011

(65) Prior Publication Data

US 2012/0009313 A1 Jan. 12, 2012

Related U.S. Application Data

(60) Provisional application No. 61/365,022, filed on Jul. 16, 2010, provisional application No. 61/439,899, filed on Feb. 6, 2011.

(51) Int. Cl.
*A23L 1/216* (2006.01)
(52) U.S. Cl. ......... 426/637; 426/615; 426/390; 426/416
(58) Field of Classification Search .................. 426/637
See application file for complete search history.

Primary Examiner — Humera Sheikh
Assistant Examiner — Patricia George
(74) Attorney, Agent, or Firm — Thaddius J. Carvis

(57) ABSTRACT

Potatoes are processed to develop baked and fried flavors and aromas. The are baked to create a number of characteristic baked flavors and textures. When fried, a whole other group of flavors and textures is achieved. To avoid damage to the discrete potato pieces that are prepared in processing and are desired in the final product, the process entails baking potatoes; pressing the potatoes to a predetermined thickness; freezing the potatoes; breaking the potatoes into discrete pieces; drying the discrete pieces to form a skin thereon and preferably lightly brown the surfaces; and freezing and packaging the pieces. Oven heating will be sufficient to provide a browning effect to a light golden to golden brown color and form a skin on the exterior surface of exposed potato pulp, both important to the preparation of the best product.

4 Claims, 16 Drawing Sheets

FIG. 2
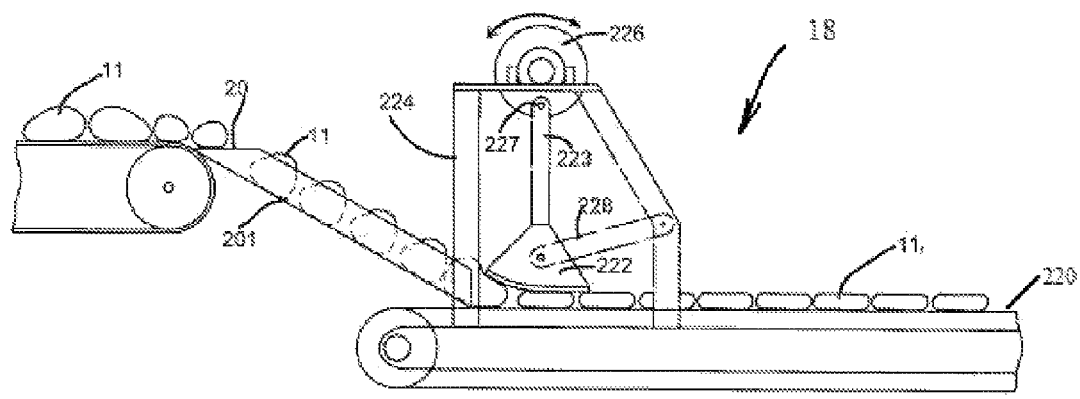
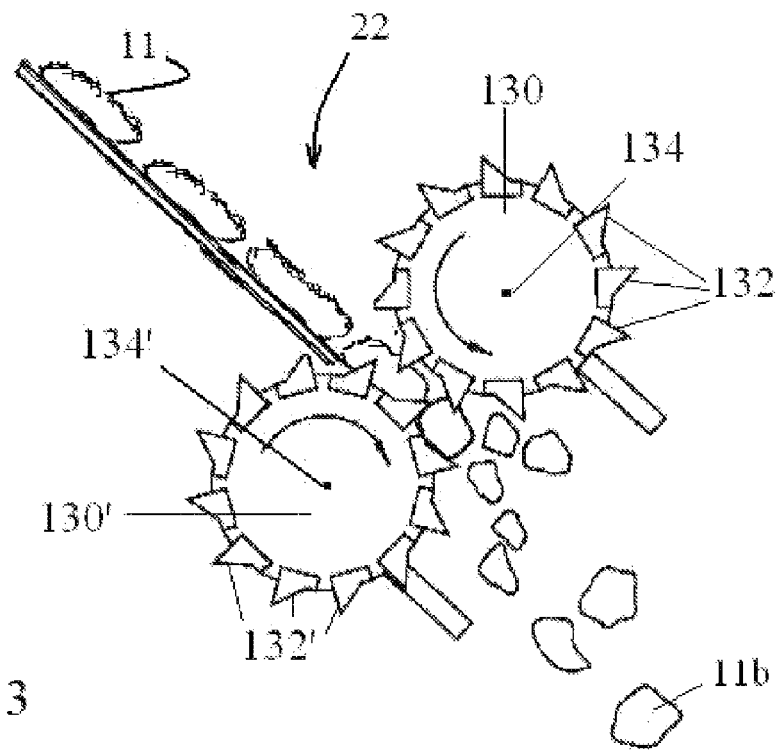
Fig. 3

(Graph 4-1)

(Graph 5-1)

(Graph 5-2)
Peak Load comparison of 20 Potatoes
(Before and after Rehydration)

(Graph 5-3)
Deformation at Peak Load Comparison of 20 Potatoes
(Without and with Rehydration)

(Graph 5-4)
Work Done to Hardness Comparison of 20 Potatoes
Without and With Rehydration (Graph 6-1)

(Graph 6-2)

(Graph 7-1)
Iodine Index Comparison of Raw Potatoes and Potatoes Baked to 75.7%, 72.0%, and 66.0% Moisture

(Graph 7-2)
Average Iodine Index of Raw Potatoes and Potatoes Baked to 75.7, 72.0, and 66.0% Moisture

Graph 8-1: Average Peak Load of Baked Russet potatoes and Russet Fryable Baked Potato Pieces (Top Line)

Graph 8-2: Average, Minimum, and Maximum Peak Load of Baked Russet potatoes and Russet Fryable Baked Potato Pieces (Back Graph)

Graph 8-3: Average Peak Load of Baked Red potatoes and Red Fryable Baked Potato Pieces (Top)

Graph 8-4:
Average, Minimum, and Maximum Peak Load of Baked Red potatoes and Red Fryable Baked Potato Pieces (back)

Graph 8-5: Average Deformation at Peak Load of Baked Russet potatoes and Russet Fryable Baked Potato Pieces (Top)

Graph 8-6: Average, Minimum, and Maximum of Deformation at Peak Load of Baked Russet potatoes and Russet Fryable Baked Potato Pieces (Back)

Graph 8-7: Average Deformation at Peak Load of Baked Red potatoes and Red Fryable Baked Potato Pieces (Top, at end)

Graph 8-8: Average, Minimum, and Maximum of Deformation at Peak Load of Baked Red potatoes and Red Fryable Baked Potato Pieces (Back)

Graph 9-1: Average Peak Load of Baked Russet potatoes and Russet Fryable Baked Potato Pieces (Top at end)

Graph 9-2: Average, Minimum, and Maximum Peak Load of Baked Russet potatoes and Russet Fryable Baked Potato Pieces (Back)

Graph 9-3: Average Peak Load of Baked Red potatoes and Red Fryable Baked Potato Pieces (Bottom at end)

Graph 9-4: Average, Minimum, and Maximum Peak Load of Baked Red potatoes and Red Fryable Baked Potato Pieces (Back)

Graph 9-5: Average Deformation at Peak Load of Baked Russet potatoes and Russet Fryable Baked Potato Pieces (Top at end)

Graph 9-6: Average, Minimum, and Maximum of Deformation at Peak Load of Baked Russet potatoes and Russet Fryable Baked Potato Pieces (Back)

Graph 9-7: Average Deformation at Peak Load of Baked Red potatoes and Red Fryable Baked Potato Pieces (Bottom at end)

Graph 9-8: Average, Minimum, and Maximum of Deformation at Peak Load of Baked Red potatoes and Red Fryable Baked Potato Pieces (Back)

FRIABLE, BAKED POTATO PIECES AND PROCESS

RELATED APPLICATIONS

The present application claims priority to two provisional patent applications, namely U.S. Patent Application No. 61/365,022, filed Jul. 16, 2010 and U.S. Patent Application No. 61/439,899, filed Feb. 6, 2011. And, this application is related to a regular patent application, namely, U.S. application Ser. No. 12/115,839, allowed Jun. 22, 2012, and assigned to the assignee of the present invention, hereinafter referred to as "the copending application". These applications are incorporated by reference herein in their entireties.

FIELD OF THE INVENTION

The invention disclosed herein relates generally to a new form of potato product for frozen distribution, which is prepared by fully baking the potato and breaking it into pieces suitable for frying.

BACKGROUND OF THE INVENTION

In the above-noted regular patent application, a unique product was identified. It provided bite-sized pieces of optimally-baked potato retaining the taste and texture of both the skin and pulp portions. The product exhibits a fully-baked potato flavor, texture and aroma, and it can be prepared simply for serving in any portion size with a minimum of effort. The texture of the product will include a characteristic dry, fluffy, mealy texture for the pulp on the interior of the potato and will have skin attached to unmashed pulp of the potato. The pulp will offer some resistance to the bite but will quickly become smooth like mashed potatoes when masticated. During baking, the peel (also sometimes referred to as a skin) is dried along with a layer of directly underlying pulp (e.g., extending up to 5 mm). This drying is necessary to the optimum flavor development and adds a desirable texture to the final product. In the preferred product form, the skin can be made more tender than directly after baking.

As described in the related application, the potato product is stored in frozen form and is desirably prepared for serving by heating in a microwave oven. The heating process not only heats the product but fills the air with the aroma of baked potatoes.

The products have a mealy, but not mushy, pulp portion when heated. It is cohesive to the extent that it can support its own weight, but it is not strong. Indeed, tests surprisingly revealed that the product cannot survive frying in hot oil or tossing when attempting to fry on a griddle or skillet. The starch-containing cells are ruptured during baking, and rapid moisture generation and physical handling during frying cause pieces to break apart.

Potato flavors and aromas depend on the processing. The process of baking potatoes creates a number of different kinds of flavors and textures, some of which are explained and quantified in the above-identified application. Frying potatoes provides a whole other group of flavors and textures. The inventors herein have sought a potato product that has baked as well as fried flavors. There is currently no such product. It is noted that U.S. Pat. No. 4,167,588 to Willard has attempted to provide a product having baked flavor that can be fried, but makes a product called "fabricated". The process can start with a baking step, but following that all semblance of a baked potato is largely undone. The fabricated products of Willard are processed and diluted to an extent that both the texture and flavor of the baked potato used in their preparation is significantly degraded. Willard describes processes A though D, and illustrates them in FIGS. 1 through 4, respectively. Common to all are process steps calling for: (1) separation of pulp and peel, (2) comminuting the pulp portion, (3) drying the pulp portion to below 65%, (4) mixing potato flakes and other additives with the pulp to form a dough, (5) shaping the dough to form fabricated potato pieces, and (6) eliminating or separately preparing a fabricated peel portion.

To achieve the objective of obtaining such a product, it was attempted to fry a fully-baked product as described in the noted application. However, identification of suitable processing was beset with problems regardless of care taken to avoid destruction of the integrity of the product by frying techniques commonly employed by industry and at home.

The baked product prior to frying has already been fully cooked, broken into individual bite-sized pieces and frozen. When this product starts to warm as part of the frying process, the pulpy part of the potato softens disproportionally with the skin portion, making the product difficult to handle without breaking. In addition, the pulpy portion has virtually no unruptured pulp cells and can rapidly evolve steam, causing break down with significant disintegration upon deep frying. The effects of frying are detrimental to both the shape and texture of the potato pieces. In addition, the potato pieces released fines when fried, and this resulted in early contamination of the frying oil.

There is a present need to enable production of bite-sized pieces of optimally baked potato in a form suitable for frozen distribution and final preparation by frying in oil or on a griddle or skillet.

SUMMARY OF THE INVENTION

In one aspect, the present invention provides bite-sized pieces of optimally baked potato which have pretreated and are in a form suitable for frying after frozen distribution.

According to this aspect, the product will comprise: discrete pieces of frozen baked potato including the potato skin and pulp, wherein the exposed potato pulp portion has a dried exterior layer having a toughness greater than that of the pulp prior to drying.

In another aspect, the invention provides a process for preparing bite-sized pieces of optimally baked potato in a form suitable for frozen distribution and final frying, e.g., in oil, on a heated griddle or skillet, or "oven frying".

According to this aspect, the process will comprise: baking potatoes; pressing the potatoes to a predetermined thickness; freezing the potatoes; breaking the potatoes into discrete pieces having skin and attached pulp; drying the discrete pieces sufficiently to form an exterior skin on the surface of the pulp portion and effect a light golden to golden brown color to the pulp portion and; and freezing and packaging the pieces.

In one alternative, oil can be applied to the discrete potato pieces following the drying operation.

DESCRIPTION OF THE DRAWINGS

The invention will be better understood and its advantages will become more apparent when the following detailed description is read in light of the accompanying drawings, wherein:

FIG. 2 is a schematic top plan view of a process as illustrated in FIG. 1;

FIG. 2 is a schematic perspective view of illustrative equipment of the conveying and profiling steps identified in FIG. 1;

FIG. 3 is a schematic side elevation of a device for breaking whole, profiled and frozen potatoes into pieces.

DETAILED DESCRIPTION OF THE INVENTION

Figure 1:
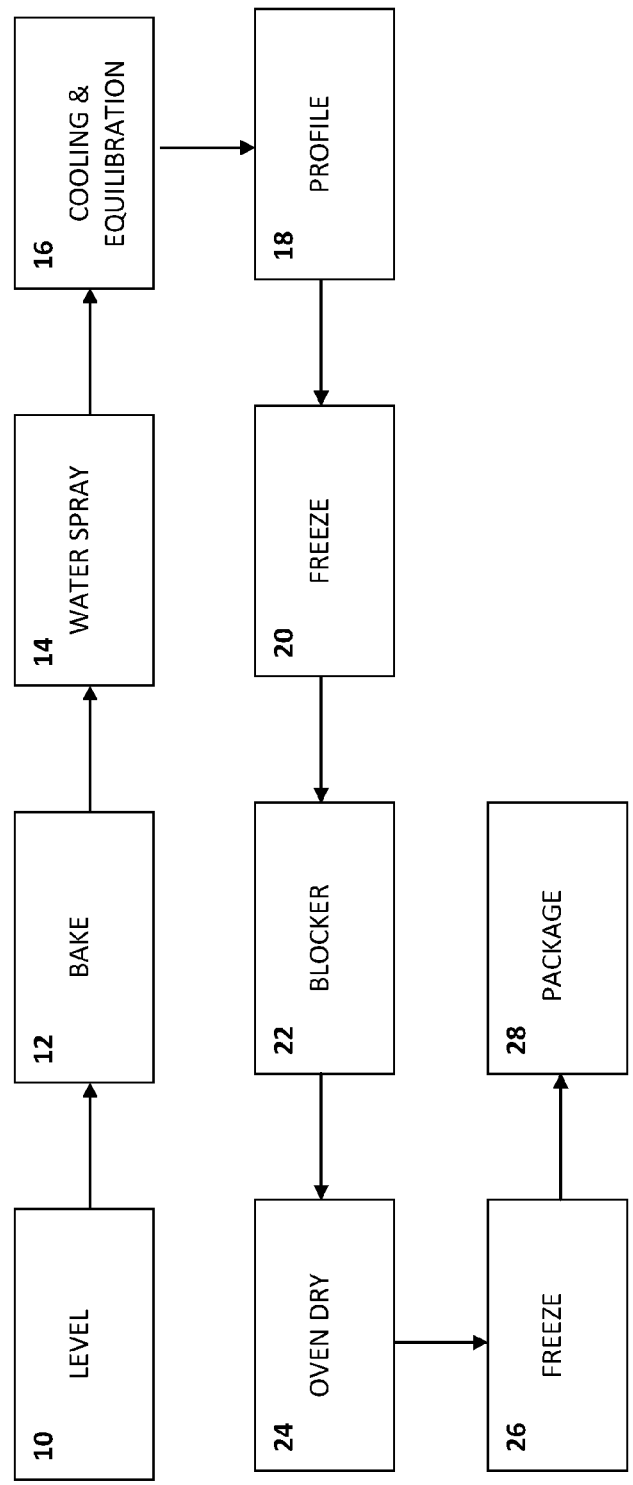
FIG. 1 is a process flow diagram for a preferred processing scheme according to the invention.
Figure 4:
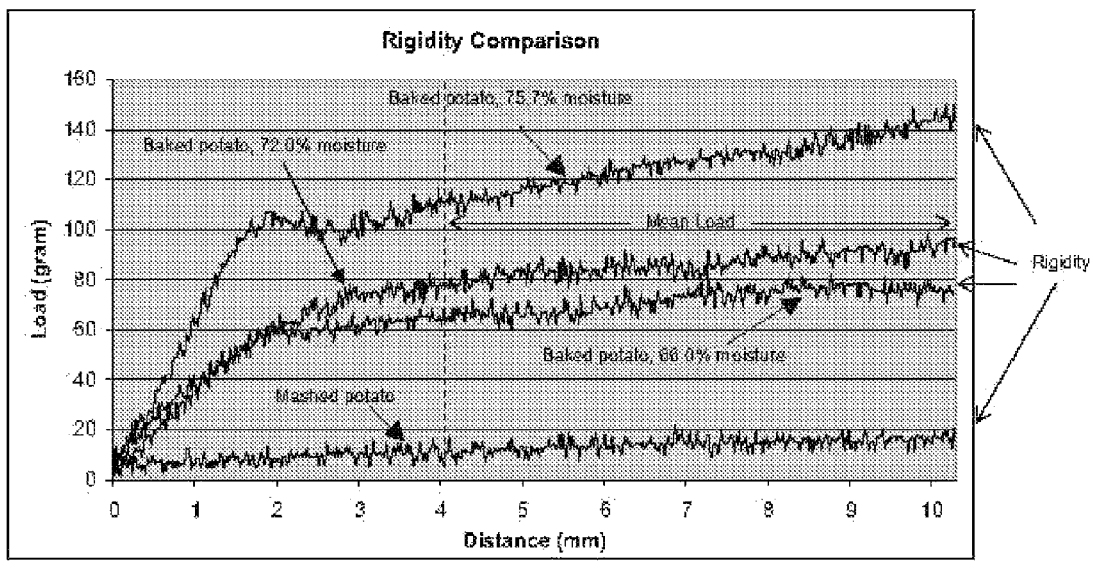
FIG. 4 through FIG. 9h, show Graphs 4-1 to 9-8, which summarize the test data derived in Examples 4 through 9.
Figure 5A:
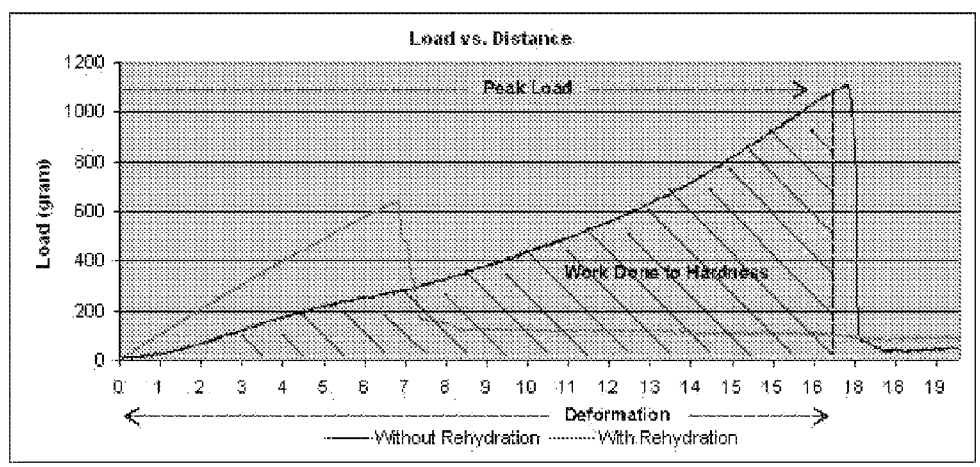
Figure 5B:
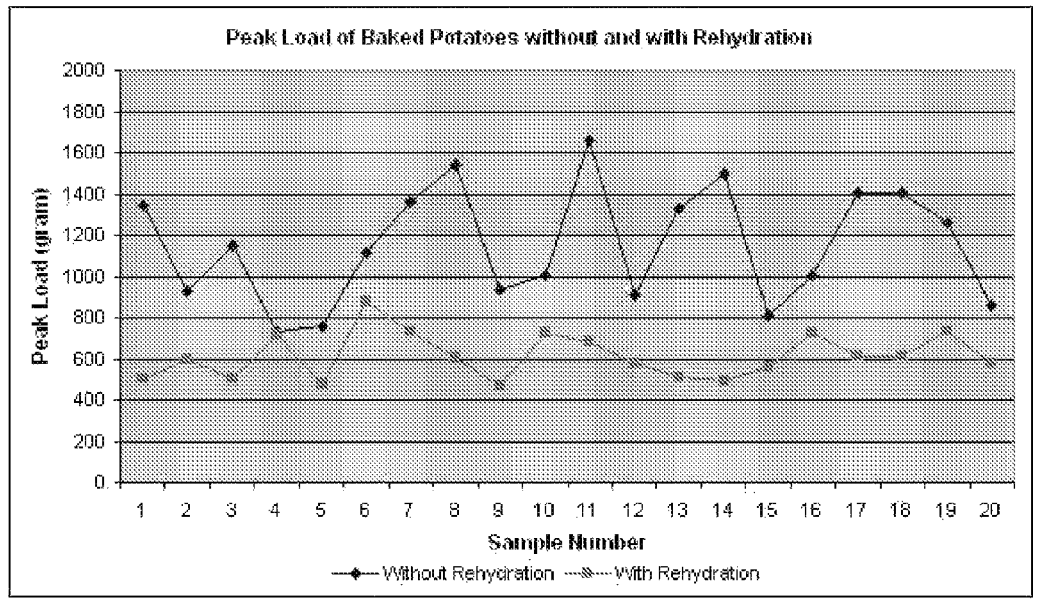
Figure 5C:
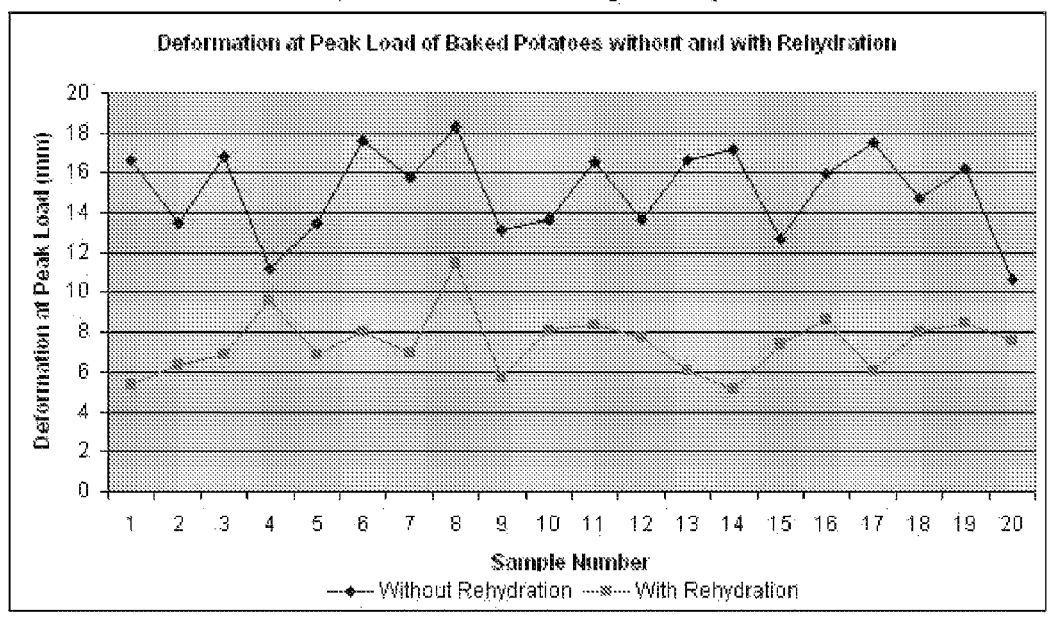
Figure 5D:
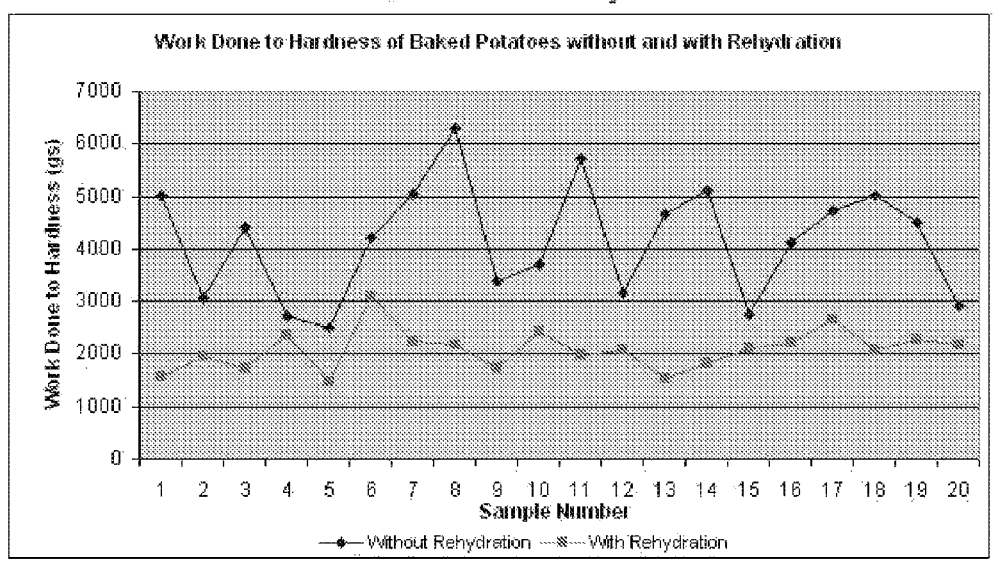
Figure 6A:
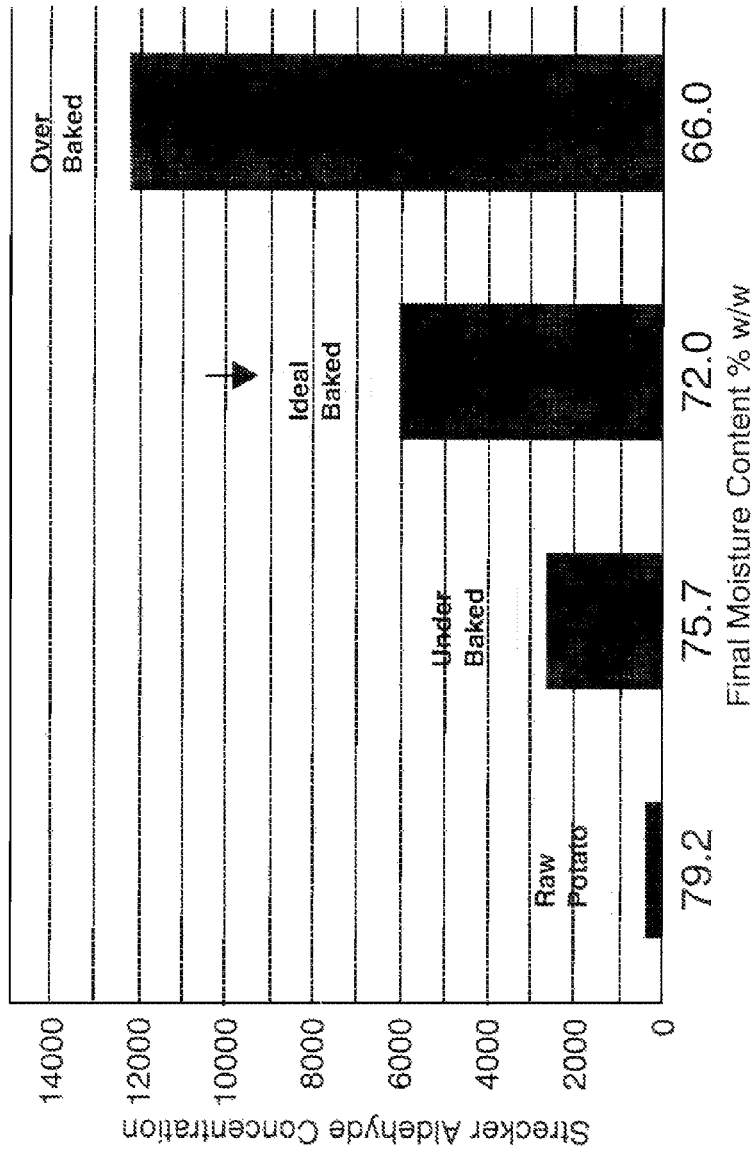
Figure 6B:
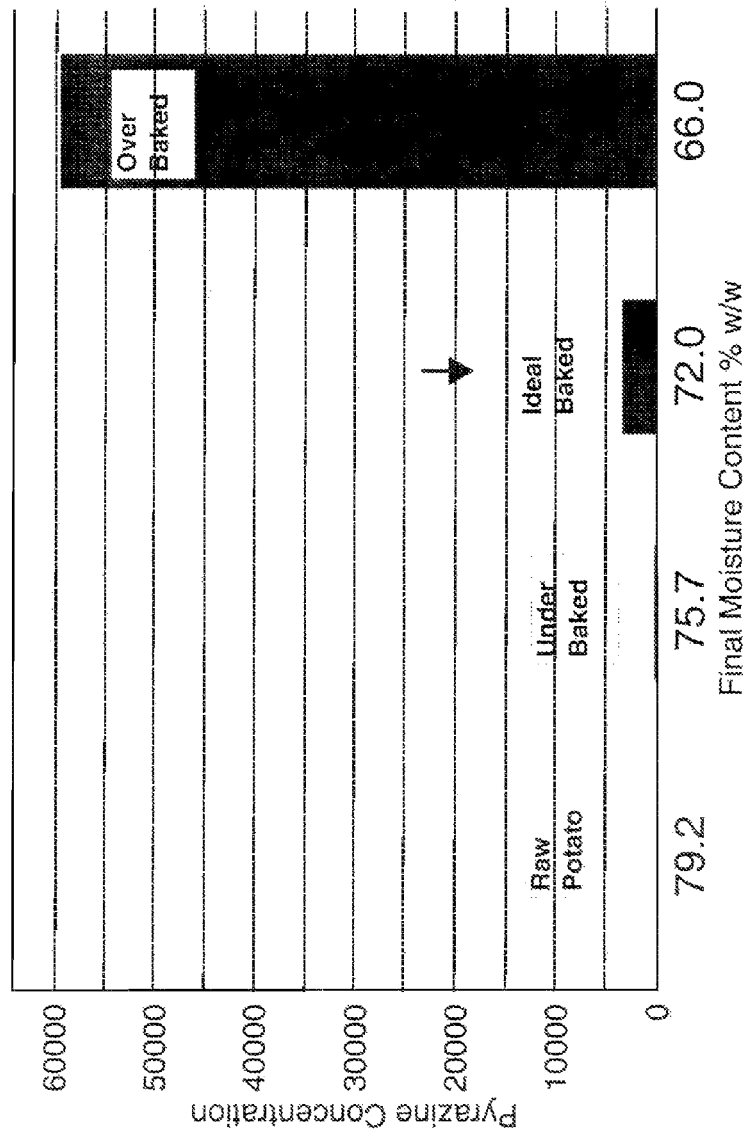
Figure 7A:
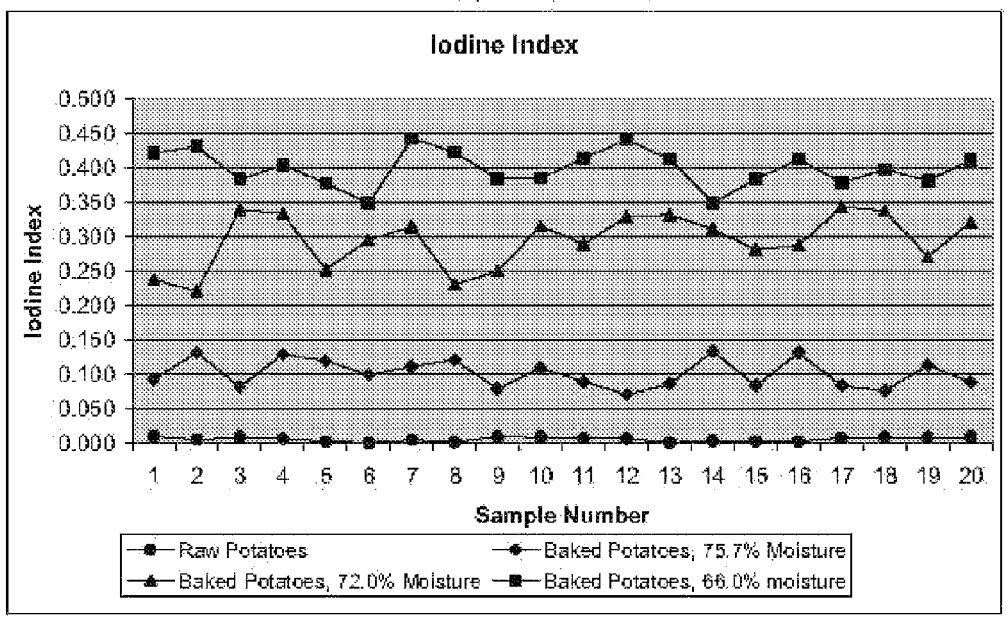
Figure 7B:
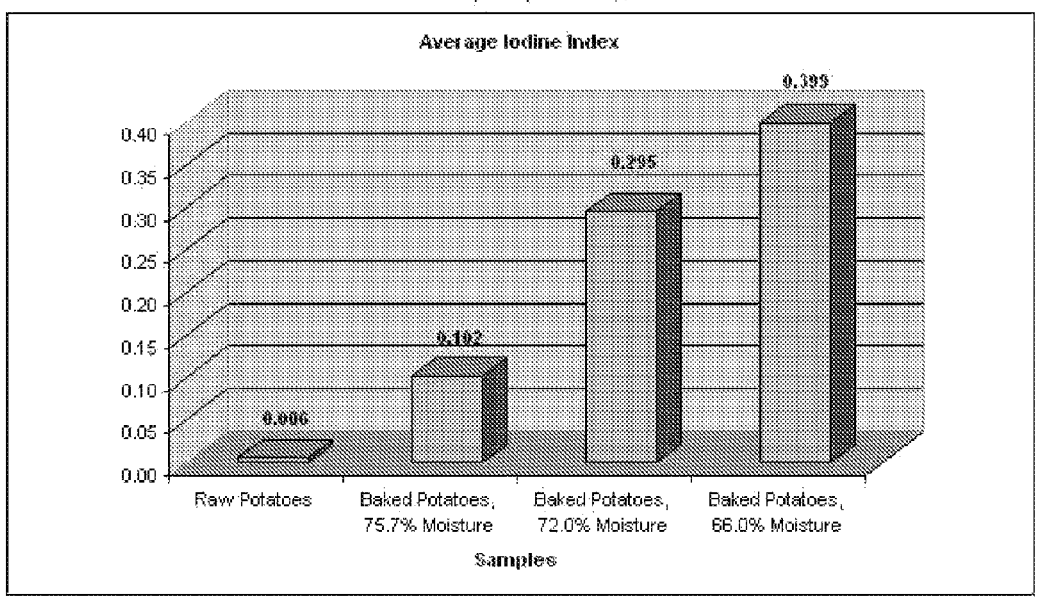
Figure 8A:
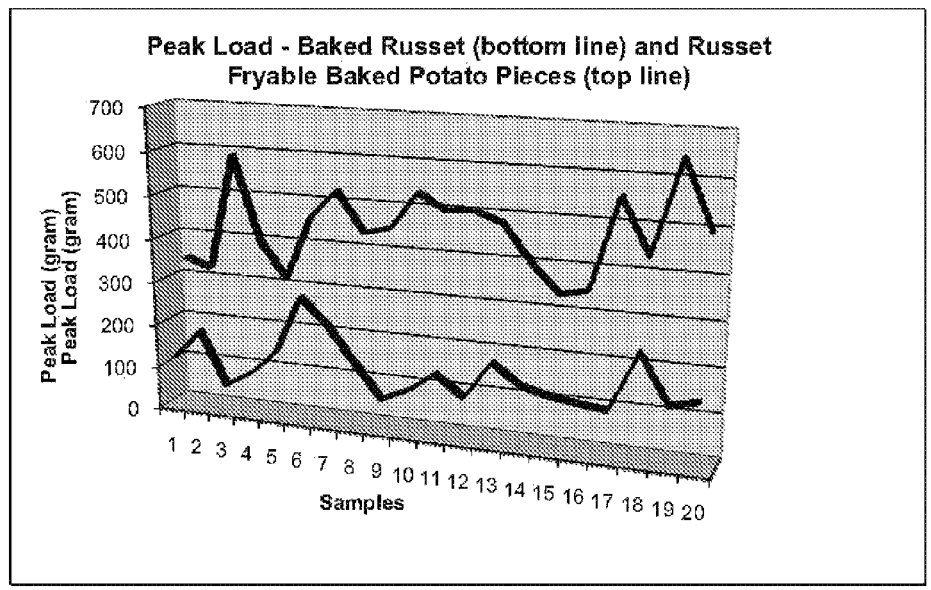
Figure 8B:
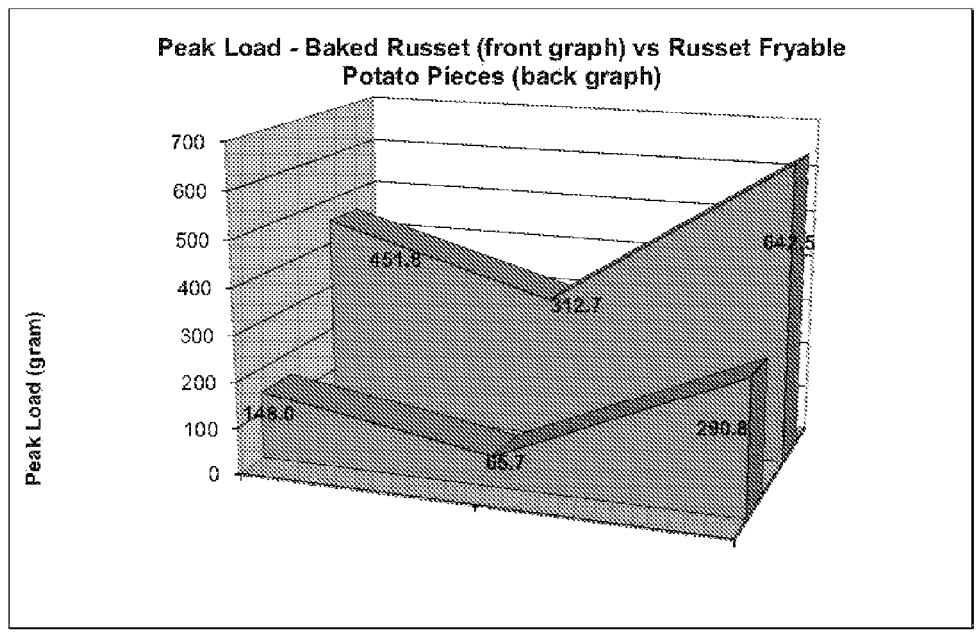
Figure 8C:
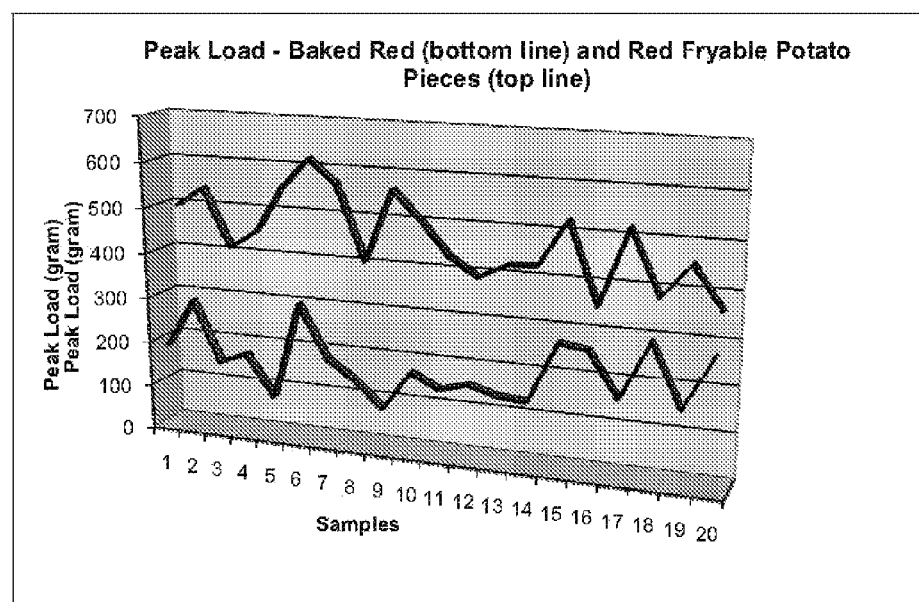
Figure 8D:
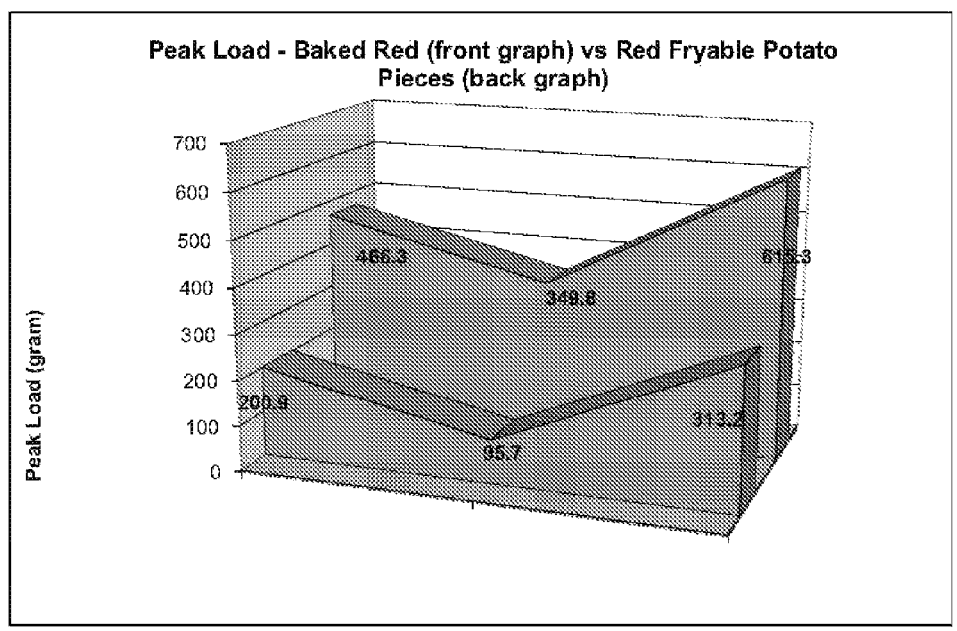
Figure 8E:
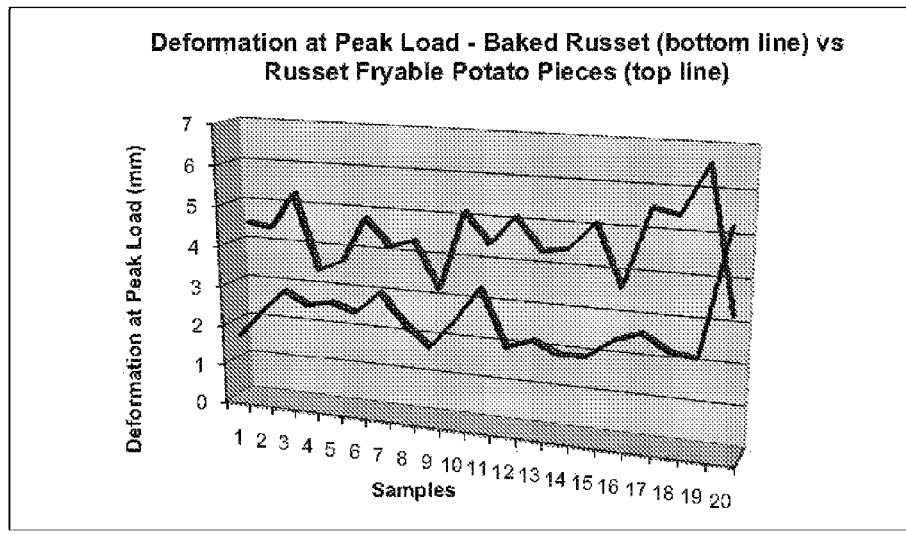
Figure 8F:
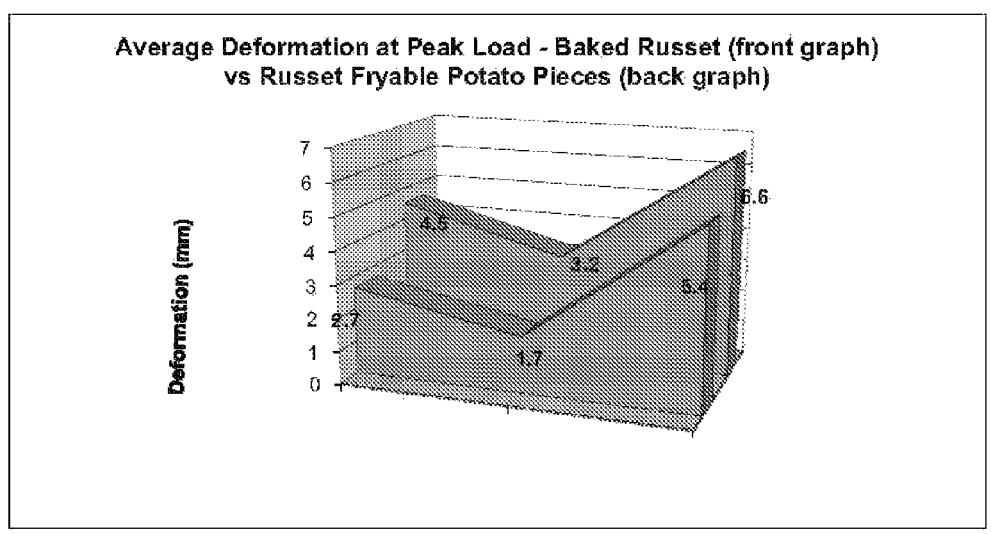
Figure 8G:
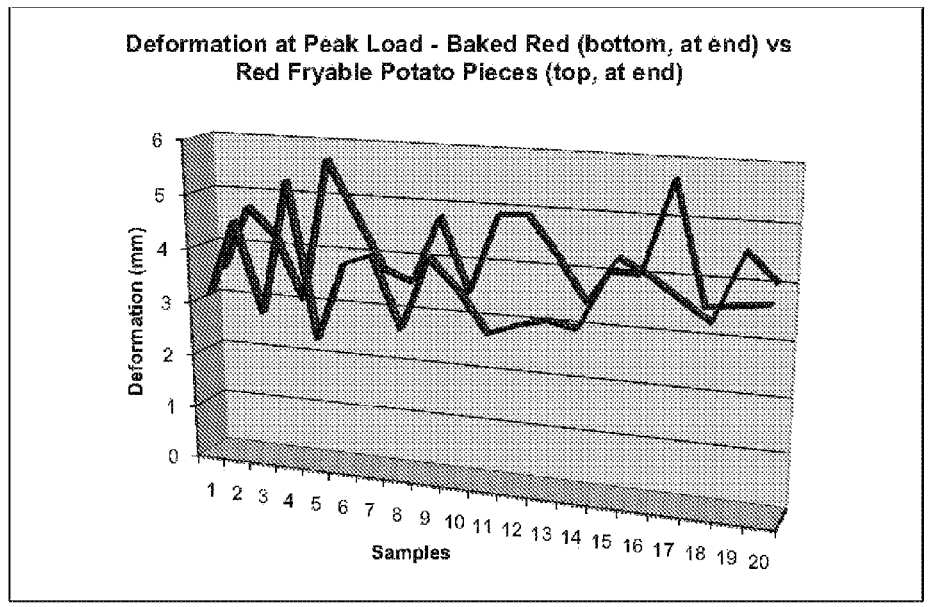
Figure 8H:
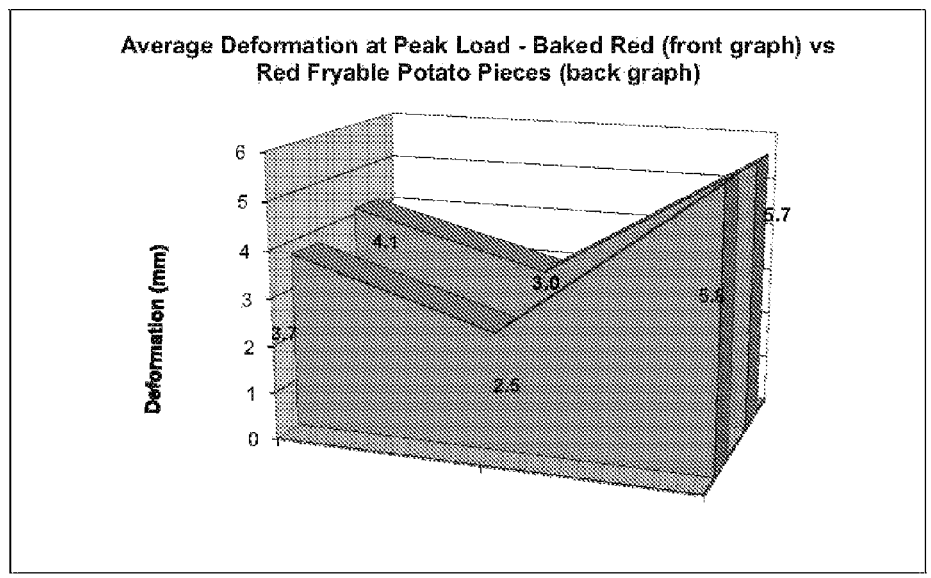
Figure 9A:
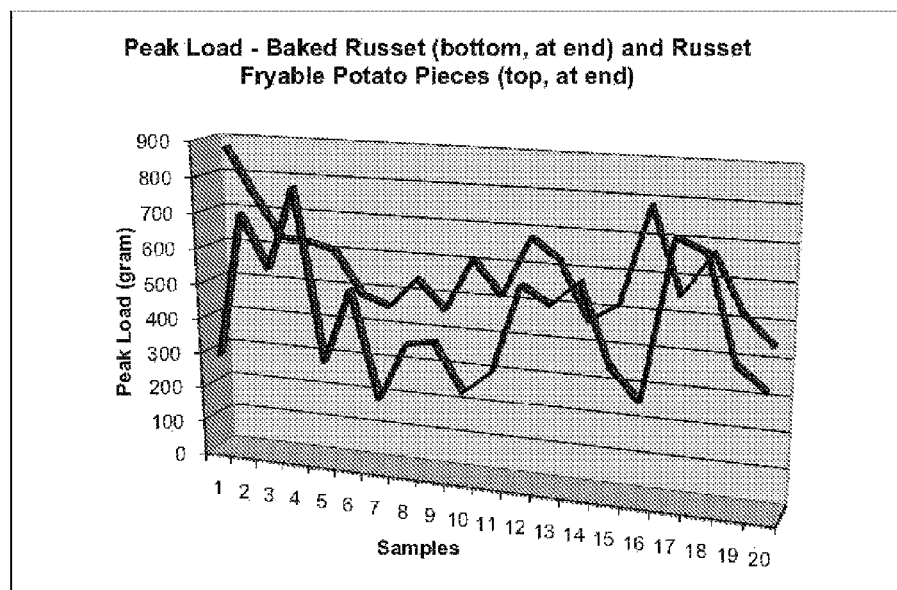
Figure 9B:
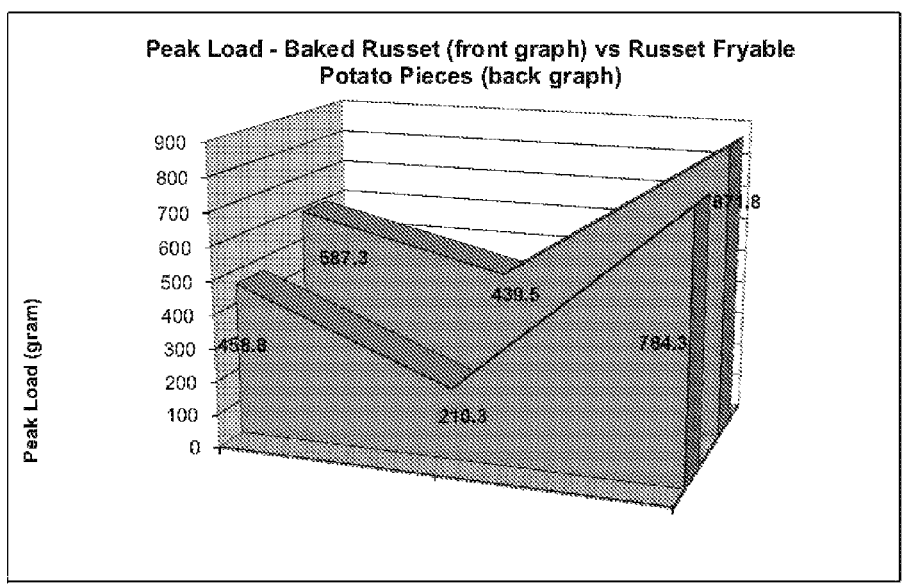
Figure 9C:
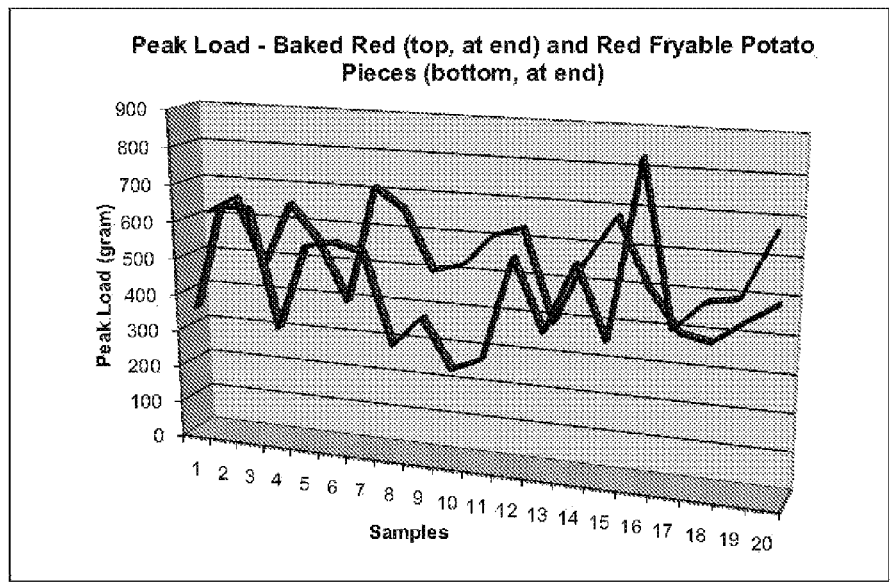
Figure 9D:
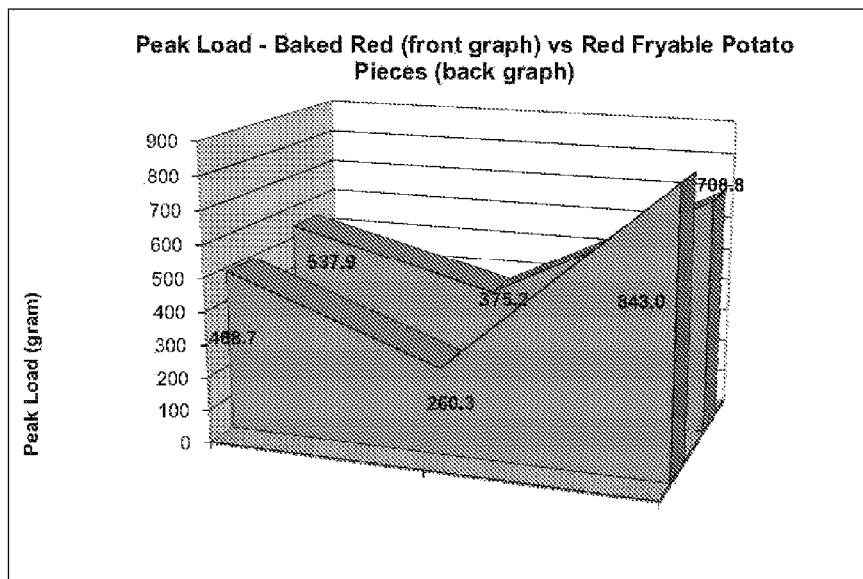
Figure 9E:
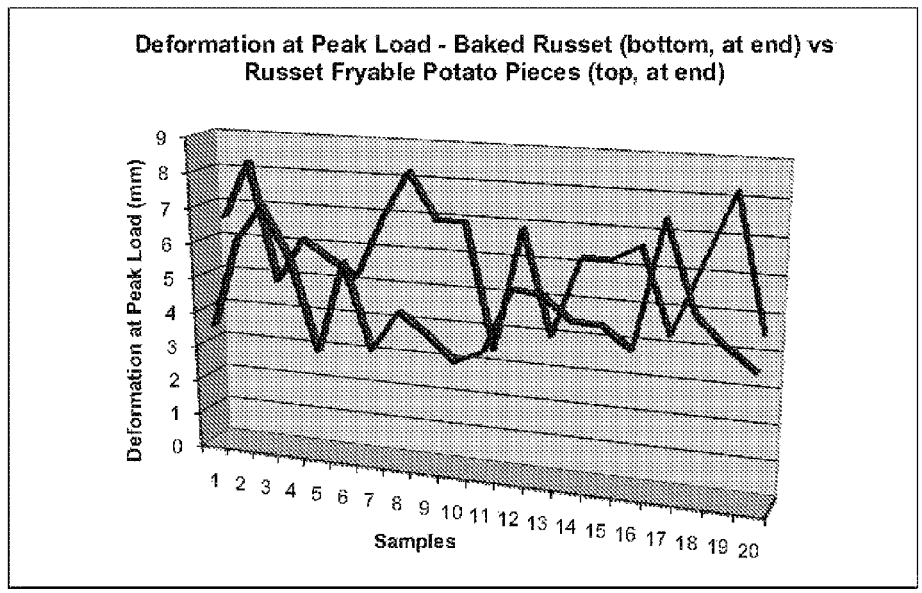
Figure 9F:
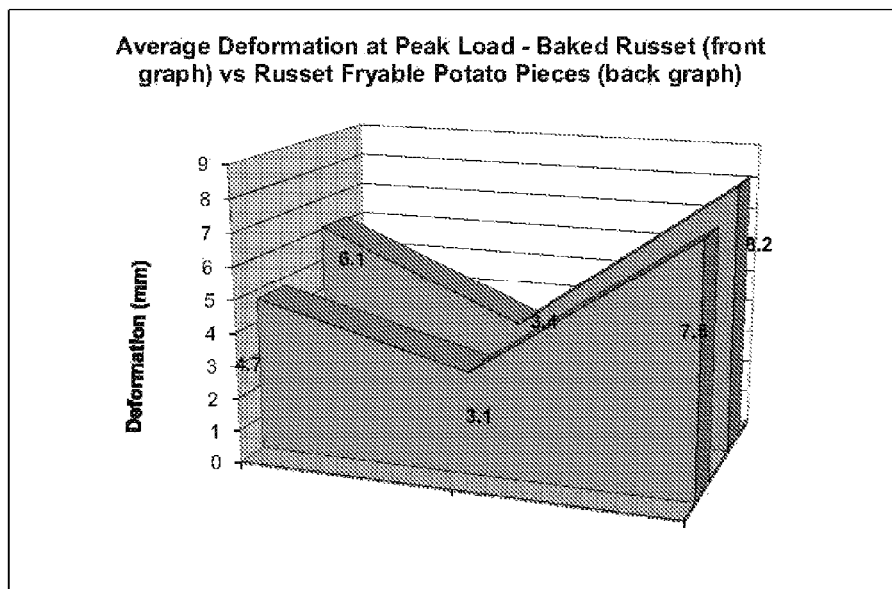
Figure 9G:
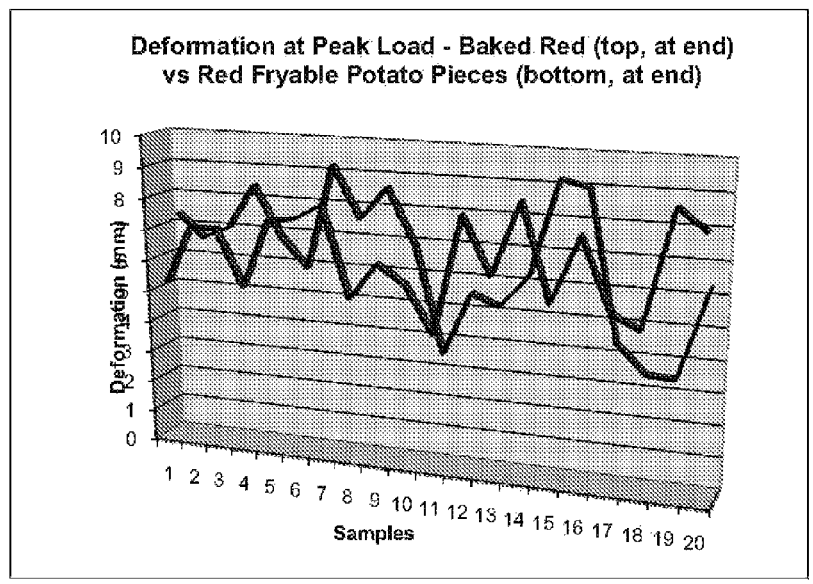
Figure 9H:
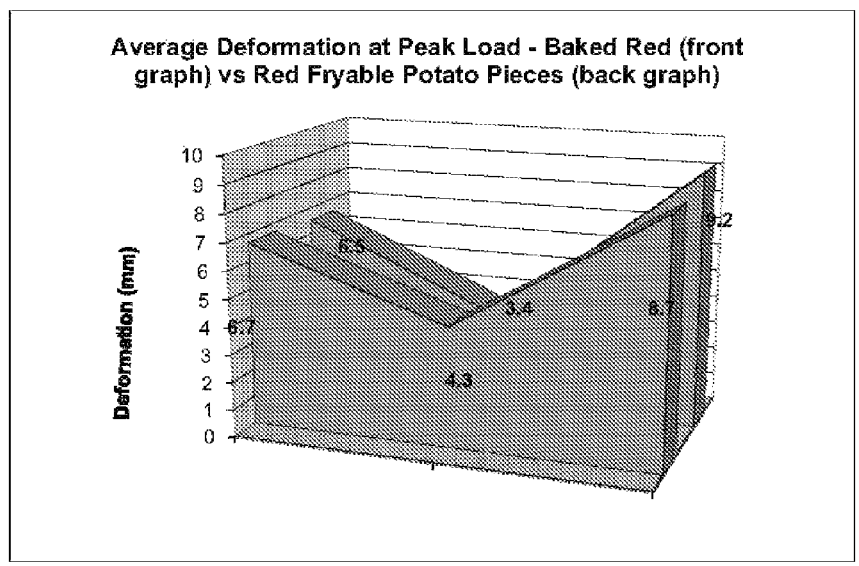

The invention will preferably employ potato pieces processed as described in copending U.S. patent application Ser. No. 12/115,839, filed May 6, 2008, which application and the provisional applications upon which it is based, all of which are incorporated herein in their entireties.

The process of the invention will in most respects follow that of the above-noted copending application, with the notable exception that special processing is required to enable the potato pieces to stand up to frying in a manner typical of restaurant or home cooking, e.g., by deep fat frying, frying on a griddle or skillet, or "oven frying". By the term "oven frying" we mean that the product will take on a fried character after heating in an oven. The potato products of the invention are "fryable baked potato pieces", and are sometimes referenced by the term "Spuddies" in the figures and graphs accompanying this description.

Below, we will describe the processing as requiring an oven heating step, which is to be followed by the blocking procedure to produce discrete potato pieces as previously described. Thus, according to the process of this invention, those discrete potato pieces are conveyed though a suitable oven, such as a commercial three-stage oven having temperature zones for oven heating to prepare them in a form that will not only be flavorful but will stand up to heating by frying.

As will be described below, the heating temperatures and times will vary for different potato varieties, but will be sufficient to form a skin on the exterior surface of exposed potato pulp and, preferably, provide a browning effect to a light golden to golden brown color, as effective for the preparation of a quality product that will stand up to later frying.

As explained in the above-noted copending applications, the process of baking potatoes causes a variety of changes in potatoes. These changes are necessary to provide the taste that consumers expect from a baked potato. Experts in potato technology and tasting can identify an optimally-baked potato by texture and aroma, and such data obtained from such panels is generally highly reproducible. We note that commercial equipment is capable of preparing perfectly baked potatoes at near the upper part of the range of from about 70 to about 75% moisture by weight. The term "optimally-baked potato" as used herein will be defined as a baked potato having fully developed flavor and texture identified by expert tasters using as a standard of comparison a 6 ounce Russet Norkotah potato baked (starting moisture of from about 78 to about 81%) to a moisture content of about 72%, with comparisons to over-baked potatoes of the same variety baked to about 66% moisture and under-baked potatoes of the same variety baked to about 76% moisture.

The expert panel will be able to identify optimally-baked potato as having a flavor and aroma based on compounds generated, principally by the Maillard reaction, during the baking. Additionally, the expert panel will be able to identify the optimally-baked potato by its characteristic dry, fluffy, mealy texture that offers resistance to the bite but then quickly becomes smooth like mashed potatoes in the mouth. During baking, the peel (also sometimes referred to as a skin) is dried along with a layer of directly underlying pulp (e.g., extending up to 5 mm, but generally from 1 to 3 mm). This drying is necessary to the optimum flavor development and adds a desirable texture to the final product.

The optimally-baked potato can also be identified by objective tests of the type indicated in the examples below, which quantify textural and flavor parameters. The following objective criteria will be based on tests as detailed in the examples in the copending application.

The potato pulp of an optimally baked potato will typically exhibit the following characteristics:

Average rigidity of from about 85 to about 105 grams, e.g., from about 80 to about 110 grams, where rigidity is measured as described in Example 3 of the copending application.

Average mean load of from about 75 to about 110 grams, e.g., from about 80 to about 105, where mean load is measured as described in Example 3 of the copending application.

The potato peel of an optimally baked potato will typically exhibit the following characteristics:

Average peak load without rehydration of from about 800 to about 1500, e.g., about 900 to 1300 grams, where peak load is measured as described in Example 4 of the copending application.

Average peak load with rehydration of from about 500 to about 750 grams, e.g., from about 550 to about 700 grams, where peak load is measured as described in Example 4 of the copending application.

Average deformation at peak load without rehydration of from about 12.5 to about 17.5 grams, e.g., from about 13 to about 17 grams, where deformation at peak load is measured as described in Example 4 of the copending application.

Average deformation at peak load with rehydration of from about 6.0 to about 9.0 grams, e.g., from about 7 to about 8 grams where deformation at peak load is measured as described in Example 4 of the copending application.

Average work done to hardness without rehydration of from about 2700 to about 5600 grams, e.g., from about 3000 to about 5000 grams, where work done to hardness is measured as described in Example 4 of the copending application.

Average work done to hardness with rehydration of from about 1600 to about 2600 grams, e.g., from about 1700 to about 2500 grams, where work done to hardness is measured as described in Example 4 of the copending application.

The flavor of an optimally baked potato will typically exhibit the following characteristics:

Total Strecker Aldehydes of from about 2000 to about 10,000 nanograms (ng), e.g., from about 4000 to about 8000 ng, as measured according to Example 5 of the copending application.

Total Pyrazines of from about 1000 to about 10,000 nanograms (ng), e.g., from about 2000 to about 5000 ng, as measured according to Example 5 of the copending application.

The starch in the pulp of an optimally baked potato will typically exhibit the following characteristic:

Iodine Index of from about 0.2 to about 0.4, e.g., from about 0.235 to about 0.335, as measured according to Example 6 of the copending application.

Additionally, an optimally baked potato will typically exhibit the following characteristic:

Moisture content of from about 70 to about 74%, e.g., from about 71 to about 73%, preferably about 72%.

The invention is not known to be limited to potatoes of any particular variety, but is illustrated herein throughout as using typical Russet baking potatoes, e.g., Russet Norkotah. The invention will be applicable to potatoes of other varieties, including some commonly associated with boiling. The tests indicated in the examples will yield numerical values for the other varieties for the objective criteria measured generally proportional to those of the tests herein. For example, the contrast between optimally baked and under-baked and over-baked potatoes will be at about the same ratios as indicated in the examples, but the absolute numbers will differ with the varieties.

Baking potatoes are often thought of as starchy due to their different starch makeup and the way they respond to baking. In appearance, they tend to be long and have a coarse, cork-like skin. They are high in amylose starch, with a dry, mealy texture. But, the pulp turns light and fluffy when cooked. Russets are generally preferred and are typically known as Russet Norkotah, Russet Burbank, Russet Arcadia, Norgold Russet, Russet Goldrush, Long White (or White Rose or California Long White), and Idaho (which is loosely used to describe Russets).

Boiling potatoes are considered by many as waxy potatoes, due to their high amylopectin contents. They come in a variety of shapes and can be long or round. They typically have a thin, smooth skin and an almost waxy flesh or pulp. They are relatively high in moisture and sugar, but low in starch. This type of potato can be mashed but the results tend to be thicker and lumpier than achieved for baking potatoes. Often thought of as being boiling varieties are those sold as round white, round red, yellow potato, red potato, salad potato, la soda, red la rouge, red Pontiac, red nordland, red bliss, yellow Finnish, ruby crescent, and Australian crescent.

Reference to FIG. 1 shows a flow diagram of one process for preparing a product according to the invention. The drawings illustrate a preferred arrangement for preparing potato products according to the invention, from start to finish. Incoming potatoes are scrubbed at a station in conventional manner (not illustrated), as may be accomplished before or after inspection. Scrubbing can entail scrubbing with brush rolls (not shown) in conjunction with water spray being tumbled as they are fed by gravity. They are then conveyed onto a belt, e.g., of mesh or stainless steel sheet, where they are leveled 10 for passing though an oven 12 for baking. If desired, potato pieces can be made substantially as described in the above-noted copending patent application and then subjected to the further processing as described herein to condition them for the rigors of frying.

The potatoes (shown as 11 in FIG. 2) are baked until done to a degree where the baked potato flavor is well developed and the texture of the pulp has a degree of resistance to the bite but quickly reaches a smooth texture in the mouth upon chewing. These criteria are generally well recognized by those skilled in the art, but can also be described in terms of the objective test methods described below. The typical baking will reduce the moisture content of a Russet Norkotah potato from a typical range of about 78 to about 81% to within the range of from about 70 to about 75%, e.g., from about 70 to about 74%, say about 72%, which for this variety is typical of a perfectly baked potato. Other varieties will vary proportionally based on their raw and baked moistures. Oven conditions can be varied depending on the size and moisture of the potatoes processed, but temperatures of from about 300° to about 450° F., e.g., about 400° to 425° F., and times of about 45 minutes to about 90 minutes, e.g., about 50 to about 75 minutes, are effective for average-sized Russet Norkotah potatoes weighing about 6 ounces. The person skilled in the art will be aware of relations between times and temperatures to achieve the optimum baked potato for a given oven.

To prepare products that have a desirable skin as well as a good pulp texture, it has been further found that wetting the potatoes will cool them and rehydrate the potato skin. The potatoes are conveyed from the oven 12 to a hydration station which desirably sprays them with water at step 14 in FIG. 1, e.g., for about 1 to 3 minutes total, spraying heavily at first to cool the hot potatoes and then to a lesser degree to assure the presence of some moisture on the surfaces as they are cooled as they proceed to further processing. Total time for wetting, cooling and equilibration will typically be from about 4 to 6 minutes, but can be longer. The cooling and equilibration is shown generally as step 16 in FIG. 1. The product will absorb moisture at this stage and the moisture content of the potatoes is preferably increased to on the order of about 73 to 77%, e.g., about 74 to 76%, or about 2 to 6% more than prior to wetting.

From the water treatment, the potatoes are conveyed to profiling equipment (18 in FIG. 1), which is shown as a schematic perspective view in FIG. 2. of illustrative equipment for conveying and profiling. In FIG. 2, there are seen baked, moisture-equilibrated potatoes being conveyed down feeder chutes 201 to belt 220. The feeder to belt 220 preferably feeds the individual potatoes down the chutes which are formed by spaced guide walls 201 to assure proper operation of the next process operation of profiling (pressing uniformly to a desired thickness) the potatoes at 222 for subsequent subdividing, e.g., breaking, into bite-sized pieces. This step should be performed, such as with equipment as shown, to facilitate the later subdivision without mashing the pulp. Desirably, the potato will fracture but retain a desirable baked potato texture. In some preferred product forms, the thickness will be about three quarters of an inch. Other thicknesses, e.g., from about ¼ to about 1½ inches can be easily employed if other sized pieces are desired for a particular product application or customer.

FIG. 2 shows a device 222, which is illustrated as a long shoe and can be pressed against the potatoes as they are conveyed under it. It also illustrates a preferred apparatus arrangement to manipulate the shoe 222 to let it move in an arcing path to uniformly press the potatoes and they pass underneath it on a continuously moving conveyor 220. The pressing device 18 is shown to include a frame 224 holding a pivotable wheel 226, which rotates about 180° back and forth as illustrated by the arrow. A link pin 227 on the wheel 226 holds an elongated extension 223 of the shoe to move it up and down with the movement of the wheel 226. Also, a guide 228 is provided to limit the movement of the shoe in the line of movement of the potatoes 11 on the conveyor 220. Where desired, the mechanism for moving a shoe or other press device may be employed. In some embodiments it is contemplated to use converging conveyor belts or rollers such as can be used for flattening dough sheets.

From the profiling station 18, the flattened potatoes $11_f$ are moved to a freezer as shown in the copending application. The flattened potatoes $11_f$ will be frozen at least partially, but they need not be fully frozen at this point. It is, however, important that the potatoes $11_f$ maintain their flattened shapes with little or no bending or the like that would impair feeding of the potatoes $11_f$ into equipment for breaking or cutting them into the desired sized pieces. Storage in boxes or other containers can add flexibility to the process.

FIG. 3 is a schematic side elevation view of feeder and blocker equipment as referenced as 22 in FIG. 1. Typically the pieces will have a minor dimension of at least about ¼ inch and a major dimension of less than 1 inch. Pieces within this general size range will be free flowing when frozen, bite-sized for eating and easily measure in portion controlled amounts. The size of the pieces will be such that does not destroy the texture of the potato pulp, preferably leaving it with the texture and mouthfeel of baked potato as broken apart with a fork in readiness for eating.

The potatoes $11_f$ are shown being conveyed into blocker equipment, generally 22, as identified as roller pairs 130, 130' in this schematic side elevation view. It is an alternative to this embodiment, the potatoes will not be "profiled" or flattened, but flattening is preferred because it tends to limit the production of fine particles.

Typically the pieces from the process and apparatus of this invention will have a minor dimension of about 1 inch and a major dimension of about 1 inch. Obviously, adjustments of the size of the blades and their spacing can provide other sizes, e.g., from about 0.5 in any one linear dimension up to 1.5 inches in any other. It is an advantage of the present invention, with the target size being a one inch cube, that fines are kept to a minimum, e.g., pieces smaller than about 6 mm, will make up less than about 10% by weight, and preferably less than 5% by weight of the total product.

Pieces within this general size range will be free flowing when frozen, fork or bite-sized for eating and easily measured in portion-controlled amounts. The size of the pieces will be such that does not destroy the texture of the potato pulp, preferably leaving it with the texture and mouthfeel of baked potato as broken apart with a fork in readiness for eating.

FIG. 3 shows the blocking or cutting procedure from the side in a schematic side elevation. The apparatus 22 includes at least one roller pair comprising diagonally-opposed, spaced cutting blades 132, 132' for subdividing the potato into discrete pieces. The arrows indicate the rotation of one roller pair, 130 and 130'. The rollers each have sturdy cutting blades 132, 132' projecting from the roller surfaces. The blades are preferably diagonally aligned, e.g., at an acute angle such as from about 15° to about 60°, typically within the range of from about 20° to about 40°, e.g., from about 25° to about 35°, with respect to a line passing through the axis 134 of one of the rollers, e.g., 130, and will be diagonally opposed from one roller of the pair to the other. The length of the blades 132, 132' in the direction of the axis 134 of the rollers will typically be less than about 4 inches, say from about 0.5 to 2 inches, e.g., about 1 inch, and the blades will be spaced circumferentially by about an inch or so, and will be axially offset, from one roller to the other, typically by the axial length of the blades, thereby leaving gaps between blades on a roller. The gaps on the two rollers are preferably complimentary. A blade on one roller will preferably be pressed into a potato on one side while an offset blade will be pressed into the other side will be pressed into the other side of the potato. This type of arrangement has been found to provide clean fracturing of the frozen potatoes into good-sized pieces, similar to what one might obtain by breaking up a hot baked potato with care with a fork for eating. The dimensions and spacing of the blades, as well as the degree to which the potatoes are flattened can be varied to obtain the desired product size of product pieces, $11_b$.

Broken, frozen potato pieces $11_b$ fall from the blocker 22 and are collected by means not shown. The collected potato pieces are essentially free flowing and will remain so when properly stored under freezer conditions.

According to the process of this invention, those discrete potato pieces $11_b$ are conveyed though a suitable oven in Step 24, such as a commercial three-stage oven having temperature zones for oven heating to prepare them in a form that will not only be flavorful but will stand up to heating by frying. The heating temperatures and times will vary for different potato varieties, but will be sufficient to provide an incipient browning effect to achieve a light golden to golden brown color and form a skin on the exterior surface of exposed potato pulp. Both the browning and the skin formation are important to the preparation of the best product. The moisture content of the pieces will be decreased somewhat, preferably on the order of from about 2% to less than about 6% by weight, e.g., from 3% to 4%, with the reduction taking place mainly near the surface so as to toughen the surface. The moisture will typically be reduced to from about 66 to 70%, e.g., to from about 67 to 68% by weight of the product at this stage in processing.

Following the blocking operation of Step 22 in the case of Russet variety potatoes, the discrete potato pieces as described can be held as desired or are directly conveyed though a commercial three-stage oven having temperature zones set at 400-430° F., 370 to 400° F. and 370 to 400° F. for from about 15 to 20 minutes. The oven heating will prepare them in a form that will not only be flavorful but will stand up to heating by frying. The zones within the oven are typically of substantially equal length and a preferred total time in the oven is on the order of about 17 minutes.

Following the blocking operation Step 22 in the case of Red variety potatoes, the discrete potato pieces as described are conveyed though a commercial three-stage oven having temperature zones set at 400-430° F., 340 to 370° F. and 330 to 370° F. for from about 15 to 20 minutes. The oven heating will prepare them in a form that will not only be flavorful but will stand up to heating by frying. The zones within the oven are typically of substantially equal length and a preferred total time in the oven is on the order of about 18 minutes.

Following the oven drying of Step 24, the discrete potato pieces are again frozen in known fashion at Step 26 packaged at Step 28 and.

Alternatively, the potato pieces from Step 24 can be sprayed with oil or par fried to make them suitable for "oven frying" wherein they will be placed in a conventional oven for browning as is done with commercial French fry products. The amount of oil added will be sufficient to substantially coat all surfaces, without adding so much that the product has an excessively oily mouthfeel. Typical oil additions are on the order of from about 5 to 10%.

The process of the invention enables the potato pieces to stand up to frying in a manner typical of restaurant or home cooking, e.g., by deep fat frying, frying on a griddle or skillet, or "oven frying", i.e., take on a fried character after heating in an oven. In all cases, the products are prepared to taste in the final preparation, heating sufficiently to heat the product throughout and brown the surface, e.g., to from 0 up to 2 on the USDA Color Standards For Frozen French Fried Potatoes, 1988. For frying on a griddle or in a skillet, the frozen pieces are heated as would be normal for making hash browns. For oven heating, baking temperatures of above 350° F., e.g., from about 375° to 450° F. are effective.

The following examples are presented to further illustrate and explain the invention and are not to be taken as limiting in any regard. Unless otherwise indicated, all parts and percentages are by weight based on the product or formulation at the indicated stage of processing.

EXAMPLE 1

This example illustrates the preparation of potato products according to the invention from Russet variety potatoes.

Russet Norkotah potatoes having an average weight of about 6 ounces were processed according to a process as outlined in FIG. 1. The potatoes were scrubbed and arranged in a level layer on a mesh conveyor. The potatoes were passed through an oven maintained at 420° F. for about 55 minutes, during which they were baked to a moisture content of about 72%. The potatoes were then passed down channels while being sprayed with water for a total hydration time of about 2.25 minutes to increase the moisture content of the potatoes to about 73.5%. The potatoes were then conveyed under a profiling apparatus to flatten the potatoes to a thickness of about % of an inch. The flattened potatoes were then passed through a commercial freezer having a first zone at a temperature of about 0° F. and a second zone at a temperature of about −40° F. for about 45 minutes, until the potatoes are substantially fully frozen. The flattened, frozen potatoes are then collected in plastic-lined corrugated cardboard totes and stored in a freezer until needed for further processing. The frozen, flattened potatoes were fed to a blocking device and broken into pieces which set a target potato piece size of 7/16 inch by 3/4 inch by 3/4 inch, with the actual pieces being randomly sized with this as being a fair description of average dimensions.

Following the blocking operation, the discrete potato pieces as described are conveyed though a commercial three-stage oven having temperature zones set at 420° F., 390° F. and 390° F. for oven heating to prepare them in a form that will not only be flavorful but will stand up to heating by frying. The zones are of substantially equal length and the total time in the oven is on the order of about 17 minutes. Processing will be sufficient to provide a browning effect to a light golden-brown color and form a skin on the exterior surface of exposed potato pulp, both important to the preparation of the best product, without significantly reducing the moisture content of the pieces.

The product is then frozen packaged in polyethylene bags of the type ordinarily used for packaging frozen vegetables or French fries.

The resulting frozen potatoes are prepared for consumption by frying either in hot oil, like frozen French fries or in a skillet as for hash browns.

EXAMPLE 2

This example illustrates the preparation of potato products from red potatoes according to the invention.

The process of Example 1 is repeated but the oven temperatures for the oven-heating step will have temperature zones set at 420° F., 360° F. and 350° F. The zones are of substantially equal length and the total time in the oven is on the order of about 19 minutes. Processing will be sufficient to provide a browning effect to a light golden-brown color and form a skin on the exterior surface of exposed potato pulp, both important to the preparation of the best product, without significantly reducing the moisture content of the pieces.

EXAMPLE 3

This example illustrates the preparation of potato products ready for "oven frying". Frozen potato pieces as prepared in Example 1 were rebaked at 335 degree F. for 25 minutes then par-fried at 390° F. for 15 seconds then frozen. For final preparation, they were Baked in a conventional oven at 450° F., 10 minutes. The result was a oven-able product has good texture and flavor, and not an excessively oily mouthfeel.

For all of the examples variations in times and temperatures will be made as equipment changes, but the person skilled in the art will be able to reproduce the important aspects of the invention by using the above as guidelines.

EXAMPLE 4

This example reports a textural evaluation of the pulp of potatoes baked according to the invention of the copending application with control samples to illustrate the textural properties of potato pulp when baked in accord with the invention and compare them to products not optimally processed.

Objectives:

To analyze and differentiate the characteristics of internal texture or pulp of potatoes baked to 72.0% moisture considered ideally baked potatoes from raw potatoes, potatoes baked to different moisture levels, and mashed potatoes.

Samples Analyzed:
Raw potatoes
Potatoes baked to 75.7% moisture
Potatoes baked to 72.0% moisture
Potatoes baked to 66.0% moisture
Mashed potatoes Sample Preparation:
Raw and Baked Potatoes
Use Russet Norkotah variety from the same grower, field, and lot, weight range between 5.75 and 6.25 oz.
Determine specific gravity and solid using Brine Solution method
Bake potatoes in a forced-air convection oven set at 325° F. until reaching moisture levels (calculated by weight) as mentioned above
Cut each potato crosswise to about 3 centimeter thick. Make sure the surface is as flat and even as possible
Put a 3 cm thick potato slab on the base table of the Texture Analyzer
Follow operating procedure of LFRA Texture Analyzer Mashed Potatoes
Use commercial dry potato flakes
Weigh 50 grams of potato flake
Measure 250 ml of 150° F. water
Gently pour flake into water
Rehydrate for 5 minutes
Fluff
Weigh 175 grams of mashed potato and put in a round container (3" diameter, 2" high)
Smooth the top surface to ensure it is as smooth as possible
Follow operating procedure of LFRA Texture Analyzer Analytical Method:
To be able to objectively differentiate the characteristics of internal texture among potatoes baked to different moisture levels, raw potatoes, and mashed potatoes, Texture Analyzer is used. Texture Analyzer being used for this analysis is Brookfield Texture Analyzer, Model LFRA TA, 4500 g, 115 v.

The Texture Analyzer measures the resistance of potatoes to an applied force. The force is applied through a vertical compression of a TA44, 4 mm diameter flat end stainless steel probe, which is driven through a set distance at a set speed into potato pulp. The resistance is then measured through a load cell in a unit of gram per every hundredth of a second.

Parameters for Texture Analyzer are set as follows:
The trigger point—5 grams (A load measured by a Texture Analyzer to indicate that the probe is in contact with the sample. Once the trigger point is reached, the test will begin until it reaches a defined distance at a defined speed.)
Test Speed—2 mm/second
Distance—10 mm. (With a 3 cm thickness of potato slabs, a probe will travel for 10 mm after reaching a trigger point, within 1 mm after touching a surface, which is close to a center of potatoes)
The following calculations are measured:
Rigidity: Load (gram) on the sample at a specified deformation (set at 10 mm)

Mean Load: Arithmetic mean (gram) of load between specified start and stop times (set between 4 mm and 10 mm after the point where the trigger point is reached)

Analytical Procedures:

After the samples are prepared, they are placed on the base table approximately 5 mm below the end of the probe. After the parameters are set, the testing starts as the probe travels vertically at a speed of 2 mm/second. As soon as the trigger point is reached, the load is measured as the probe penetrates for 10 mm before retracting to the original position. The graph in Graph 4-1 is plotted between load and distance. The final measurements of rigidity and mean loads are also calculated.

A puncture test is done in 3 different locations of each potato. A total of 20 potatoes are tested per set of samples. Therefore, 60 data points are generated for each set of samples to ensure that sufficient data is generated and collected and thus provides statistically significant conclusions.

Results:

As a probe travels for 10 mm through pulp of potatoes, load is measured at every hundredth of a second. Data is generated and the graph between load and distance is plotted. Examples of the plots are in Graph 4-1 as shown below.

Rigidity is the load measured at the exact 10 mm. Mean load is a calculation of load/force measured between 4 mm and 10 mm after a trigger point is reach. Loads measured before 4 mm are not used in a calculation due to an increment of load at the initial penetration that would be misleading for mean load.

Raw potatoes require extremely high load to puncture through, being more than ten times that of the cooked samples, and are not shown in Graph 4-1. The plots are examples of one puncture test. In order to conduct an analysis that generates significant and reliable data, we conducted tests with 20 potatoes and 3 different puncture tests per potato for each set of samples. Therefore, 60 data points are generated per set of samples. Table 4-1 summarizes the rigidity data from these tests.

TABLE 4-1

| | Average - Rigidity (gram) | | | | |
|---|---|---|---|---|---|
| | Raw Potatoes | Baked Potatoes, 75.7% | Baked Potatoes, 72.0% | Baked Potatoes, 66.0% | Mashed Potatoes |
| Average | 2470.07 | 143.69 | 94.95 | 70.86 | 16.33 |
| Min | 1938.00 | 106.33 | 65.17 | 49.83 | 12.67 |
| Max | 2970.17 | 189.00 | 116.50 | 97.50 | 19.83 |

Table 4-2 summarizes the mean load data from these tests.

TABLE 4-2

| | Average - Mean Load (gram) | | | | |
|---|---|---|---|---|---|
| | Raw Potatoes | Baked potatoes, 75.7% | Baked Potatoes, 72.0% | Baked Potatoes, 66.0% | Mashed Potatoes |
| Average | 2275.90 | 129.06 | 92.54 | 74.12 | 14.55 |
| Min | 1929.11 | 97.77 | 62.92 | 52.74 | 12.47 |
| Max | 2668.12 | 170.15 | 118.84 | 104.78 | 16.36 |

Conclusions:

According to Graph 4-1 there are significant differences of resistance or force required to penetrate through potato pulp among all samples, especially between raw vs. baked potatoes and baked potatoes vs. mashed potatoes. Raw potatoes require the most force, indicating the hardest texture among all samples. As potatoes are baked, moisture is removed and potato or starch cells are cooked or gelatinized causing the texture to get softer. The longer potatoes are baked, the less amount of load required during penetration. Mashed potatoes require the least amount of force during penetration.

Due to natural variation of potatoes, such as shape, cell structure, and solids distribution, the rate of heat transfer varies during baking. Therefore, in order to generate reliable data, we measure not only rigidity, which is the load at the exact 10 mm after a trigger point is reached, but also mean load, which is an average of all loads measured between 4 mm and 10 mm after the trigger point is reached. This provides an accurate measurement of the load required to penetrate through the total distance.

Differences of both average rigidity and mean load of raw potatoes, baked potatoes at different moisture levels, and mashed potatoes are significant.

We found that all samples of raw potatoes, potatoes baked to 75.7% moisture, and mashed potatoes consistently show significant differences of load measured for both rigidity and mean load. Only 1 out of 20 samples of potatoes baked to 72.0% moisture shows slightly lower load required than the rest of the samples. Also 1 out of 20 samples of potatoes baked to 66.0% moisture shows slightly higher load required than the rest of the samples. The amount of loads measured of these 2 samples is slightly different than the rest of the data; therefore, we believe this is contributed from a variation of total solids or solids distribution in potatoes even with potatoes that come from the same lot and field.

The objective results from texture analysis support our subjective sensory evaluation that texture of ideally baked potatoes (baked to 72.0% moisture) is significantly different from raw potatoes, mashed potatoes, or even potatoes that are under baked (baked to 75.7% moisture) and over baked (baked to 66.0% moisture). As potatoes are baked, internal temperature increases to the point that water starts to evaporate through the intercellular capillaries. Cell structure of potato starch, comprising of Amylose (straight chains of glucose units) and Amylopectin (branches of glucose units) also changes due to thermal reaction. Crystalline structure of Amylopectin breaks down into smaller chains increasing the ability to absorb water inside the cell and swell. This process occurs in under baked potatoes but not to the point that yield ideal texture we prefer. Our potatoes baked to 72.0% moisture possess the texture we look for in perfectly baked potatoes. As potatoes are baked longer, which we call over baked, the cell structure is completely broken down. The cells are collapsed. Excessive amount of water is removed, especially from the outer layer of the tuber. This is very noticeable from soft and mushy internal texture and hard outer skin.

EXAMPLE 5

This example reports a textural evaluation to analyze and differentiate the characteristics of potato peel after potatoes are baked to 72.0% moisture without rehydration from those being rehydrated after baking.

Samples Analyzed:
Potatoes baked to 72.0% moisture
Potatoes baked to 72.0% moisture, followed by a rehydration step Sample Preparation:
Baked Potatoes without Rehydration
Use Russet Norkotah variety from the same grower, field, and lot, weigh range between 5.75 and 6.25 oz.

Determine specific gravity and solid content using Brine Solution method

Bake potatoes in a forced-air convection oven set at 325 degree Fahrenheit until reaching 72.0% moisture (calculated by weight)

Put a whole potato on the base table of the Texture Analyzer within 2 minutes after baking Follow operating procedure of LFRA Texture Analyzer Baked Potatoes with Rehydration Use Russet Norkotah variety from the same grower, field, and lot, weigh range between 5.75 and 6.25 oz.

Determine specific gravity and solid using Brine Solution method

Bake potatoes in a force convection oven set at 325 degree Fahrenheit until reaching 72.0% moisture (calculated by weight)

Immediately soak potatoes in 120 degree Fahrenheit water for 1 minute. Alternatively, potatoes may be showered with cold tap water for a period of 2 to 2½ minutes with equivalent results Leave potatoes on a dry clean towel to dry out excess water and equilibrate for 1 minute Put a whole potato on the base table of the Texture Analyzer within 2 minutes after allowed to equilibrate Follow operating procedure of LFRA Texture Analyzer Analytical Method:

To be able to objectively differentiate the characteristics of potato peel between regular baked potatoes and those being rehydrated after baking, Texture Analyzer is used. Texture Analyzer being used for this analysis is Brookfield Texture Analyzer, Model LFRA TA, 4500 g, 115 v.

The texture analyzer measures the resistance of potato peel to an applied force. The force is applied through a vertical compression of a TA44, 4 mm diameter flat end stainless steel probe, which is driven through a set distance at a set speed into potatoes. The resistance is then measured through a load cell in a unit of gram per every hundredth of a second.

Parameters for Texture Analyzer are set as follows:

The trigger point—5 grams (A load measured by a Texture Analyzer to indicate that the probe is in contact with the sample. Once the trigger point is reached, the test will begin until it reaches a defined distance at a defined speed.)

Test Speed—2 mm/second

Distance—20 mm (Due to different thickness of peel, a probe will travel for 20 mm after reaching a trigger point in order to ensure that the probe will penetrate through the peel before 20 mm is reached)

The following calculations are measured:

Peak Load: Peak load (gram) recorded at any time during test

Deformation @ Peak Load: Distance (mm) traveled by probe at the point where peak load is achieved Work done to Hardness: Calculates work done (energy) required to obtain a given deformation or target value (set to calculate energy used from the trigger point to the point where the peak load is achieved)

Analytical Procedures:

After the samples are prepared, they are placed on the base table approximately 5 mm below the end of the probe. After the parameters are set, the testing starts as the probe travels vertically at a speed of 2 mm/second. As soon as the trigger point is reached, the load is measured as the probe penetrates for 20 mm before retracting to the original position. The final measurements of peak load, deformation at peak load, and work done to hardness are also calculated.

Puncture test is done in 3 different locations of each potato. A total of 20 potatoes are used per set of samples. Therefore, 60 data points are generated for each set of samples to ensure that sufficient data is generated and collected and thus provide a statistically significant conclusion.

Results:

As a probe travels and penetrates through the peel, load is measured at every hundredth of a second. Data is generated and the graph between load and distance is plotted. Examples of the plots are in Graph 5-1. The graph shows that it requires extremely higher load and a lot longer time to break through the peel of regular baked potatoes than those being rehydrated after baking. The graph is annotated to show how the peak load, deformation at peak load, and work done to hardness are measured during a puncture test. Peak load is the highest load measured during the test. Deformation at Peak load is the distance of the probe where the peak load is reached. Work done to hardness is the energy used to break through the peel, which equals to the area under the graph from the trigger point to the peak load.

Plots between load and distance shown in Graph 5-1 are examples of one puncture test. In order to conduct an analysis that generates significant and reliable data, we conducted tests with 20 potatoes and 3 different puncture tests per potato for each set of samples. Therefore, 60 data points are generated per set of samples. The results are summarized in Table 5-1, below:

TABLE 5-1

Comparison Of Peak Load Of Baked Potatoes Without And With Rehydration

| | Average - Peak Load (gram) | |
|---|---|---|
| | Baked potatoes without Rehydration | Baked Potatoes with Rehydration |
| Average | 1149.88 | 614.71 |
| Min | 730.17 | 471.17 |
| Max | 1662.17 | 879.33 |

Peak loads for all 20 potatoes are displayed in Graph 5-2.

In addition to peak load measurement, we also measured the distance where the peak load is achieved, called deformation at peak load as displayed in Table 5-2.

TABLE 5-2

Comparison of Deformation at Peak Load of Baked Potatoes Without and With Rehydration

| | Average - Deformation at Peak Load (mm) | |
|---|---|---|
| | Baked Potatoes without Rehydration | Baked Potatoes with Rehydration |
| Average | 15.10 | 7.45 |
| Min | 10.69 | 5.11 |
| Max | 18.37 | 11.49 |

Graph 5-3 shows plots of average deformation at peak load of each potato tested in all samples tested.

The last measurement we use is called Work Done to Hardness, which is energy required to break through potato peel. This is summarized in Table 5-3.

TABLE 5-3

Comparison of Work Done to Hardness of Baked Potatoes Without and With Rehydration

| | Average - Work Done to Hardness (gs) | |
|---|---|---|
| | Baked Potatoes without Rehydration | Baked Potatoes with Rehydration |
| Average | 4152.34 | 2086.89 |
| Min | 2502.52 | 1478.10 |
| Max | 6283.72 | 3113.26 |

Graph 5-4 shows the work done to hardness comparison of 20 potatoes without and with rehydration.

Conclusions:

According to Graph 5-1, there are significant differences of resistance or force required to penetrate through potato peel between regular baked potatoes and those being rehydrated after baking. Regular baked potatoes possess very hard and tough skin after being removed from the oven. As shown in Graph 5-1, it requires over 1000 grams to penetrate through the peel and takes about 17 mm to achieve that.

After potatoes are baked and removed from the oven, potatoes are immediately soaked in warm water (120 degree Fahrenheit) for 1 minute or showered with cold tap water for 2 to 2½ minutes. Potatoes absorb approximately 1-2% of water back during rehydration. After rehydration, potatoes are set on a clean towel to let the moisture equilibrate throughout the tuber and also allowed excess amount of water outside the peel to evaporate. After 1 minute of equilibration, outside peel is dry without excess water remaining while providing softer texture of peel, compared to regular baked potatoes. As shown in Graph 5-1, it requires only slightly over 600 grams to penetrate through the peel and takes about 6 mm to achieve that.

Peel of regular baked potatoes are very hard and tough as we found that it requires almost twice as much force to penetrate through the peel compared to those being rehydrated afterward. In addition, the peel of regular baked potatoes is very chewy and leathery, as we need to chew several times to break it with our teeth. This is confirmed by our analysis that the peel of regular baked potatoes is stretched up to 15 mm before it is broken while it only stretches for 7 mm for those being rehydrated.

Due to natural variation of potato peel and some skin defect, peel could be hard but brittle which will result in high peak load but low deformation. Therefore, we do not only measure peak load and deformation at peak load but also the total amount of energy being used from the point where the trigger point is reached to the point where the peak load is achieved, called work done to hardness. We found that all samples consistently show significant differences of load required to break through the peel and distance where the load is achieved.

The objective results from texture analysis support our subjective sensory evaluation that textures of baked potato peel is significantly different from those being rehydrated after baking. Amount of water potatoes absorbed during rehydration helps soften the skin and makes it not only more appealing as far as overall appearance but also providing a lot less chewy and leathery texture.

EXAMPLE 6

This example reports a flavor evaluation of potatoes baked according to the invention of the copending application with control samples to illustrate the flavor properties of potatoes of the invention and compare them to products not optimally processed.

The following samples were received for analysis:
1) Raw Potato w/79.2% Moisture
2) Baked Potatoes w/75.7% Moisture (Under Baked)
3) Baked Potatoes w/72.0% Moisture (Ideal Baked)
4) Baked Potatoes w/66.0% Moisture (Over Baked)

Background Information & Analysis Request

The baked potato samples listed in items 2 through 4 above were nitrogen-flushed, vacuum sealed and then frozen for transport and storage prior to analysis. Sensory trials indicate that baked potatoes with 75.7% moisture are under-baked and lacking optimum baked potato flavor. Baked potatoes that are heated to a final moisture content of 66% are considered over-baked (burnt aroma) and have poor textural properties. Studies have shown baked potatoes with a final moisture content of 72.0% yield an optimum and characteristic "baked potato" flavor that consumers desire. Raw potatoes are essentially devoid of any "baked potato" flavor and were submitted as a control. The analysis conducted comparative flavor profile analyses on the samples to quantify the types of compounds formed in the baking process and their concentrations.

Analytical Methodology

Flavor isolates were prepared and analyzed from all samples in duplicate using previously published generic methodology[1,2] including optimizations specific to this investigation. In these analyses, the potato samples were equilibrated to room temperature, cut into uniform cubes approximately 1 $cm^2$ using a food processor and mixed to produce composites. Aliquots (100 g) were then weighed and rapidly sealed into a custom design SS chamber type purge & trap apparatus. The chambers were heated to 50° C. and purged with nitrogen at a rate of 100 ml/min. for a total of 60 minutes. The volatile and semi-volatile flavor from the potatoes were trapped and concentrated on adsorbent cartridges containing Tenax-TA. The traps were spiked with internal standards (1.0 µg each of d-8 toluene & d-8 naphthalene) to facilitate quantification and normalization of the resulting data. The charged adsorbent traps were then connected to the Short Path Thermal Desorption system and thermally desorbed directly into the GC-MS system for final analysis. The thermal desorption conditions were 250° C. for 5 minutes. The resulting P&T-TD-GC-MS chromatograms were then subjected to a thorough scan-by-scan search of the data to identify all volatile and semi-volatile flavor constituents.

1) Thomas G. Hartman et al., "Flavor Characterization Using Adsorbent Trapping-Thermal Desorption or Direct Thermal Desorption-Gas Chromatography and Gas Chromatography-Mass Spectrometry", in Flavor Measurement, Ho & Manley, editors, Marcel Dekker, Inc., NY 1993.
2) Juan P. Salinas & Thomas G. Hartman, "Lipid-Derived Aroma Compounds in Cooked Potatoes and Reconstituted Dehydrated Potato Granules", in Lipids in Food Flavors, Ho & Hartman, editors, American Chemical Society, Washington D.C. 1994.

GC-MS chromatograms from the duplicate analyses of each potato sample show strong differences in chromatographic flavor profiles among the samples varying in final moisture content. Baked potato flavor is complex and consists of over 100 individual chemical compounds. The compounds that are important to "baked potato" flavor are not originally present in raw potato and are produced via thermal reactions during the baking process. The most important thermal reaction in the production of "baked potato" flavor is called the "Maillard Reaction" or "Non-Enzymatic Browning Reaction". These are heat-induced reactions that occur between reducing sugars (such as glucose) and amino acids that are present as precursors in raw potatoes. The Maillard Reaction is exceedingly complex and results in the formation of a plethora of important flavor and aroma compounds. A detailed description of the reaction is beyond the scope of this report but an excellent overview is given by Professor Donald S. Mottram in a book chapter titled "Flavor Compounds Formed during the Maillard Reaction"[3].

3) Donald S. Mottram, "Flavor Compounds Formed during the Maillard Reaction", in Thermally Generated Flavors, Parliament, Morello and McGorrin, editors. American Chemical Society, Washington D.C. 1992.

Basically, the flavor of all potato products is governed by two broad classes of compounds, lipid oxidation products and compounds generated from the Maillard Reaction. Lipid oxidation compounds arise from autoxidation of unsaturated lipid precursors present in potato (such as linolenic acid, etc.) and include a homologous series of aldehydes, ketones, furans and hydrocarbons. Lipid oxidation notes in potato are generally undesirable when levels become elevated and they are the rate limiting components that dictate shelf life of potato products. Lipid oxidation products are typically low in fresh potato products and since they are not terribly important to baked potato flavor they will not be discussed further in this report. On the other hand, the Maillard reaction is extremely important to flavor development in baked potato.

In the early stage of the Maillard reaction an important class of compound called "Strecker Aldehydes" are produced. These are simple reaction products of amino acids and reducing sugars. The most important Strecker Aldehyde in potato is called methional and this comes from the reaction of the amino acid methionine with reducing sugars such as glucose. Methional has a strong and characteristic flavor/aroma of potato. Without methional potato flavor could not exist. Flavor chemists have a term for this. They refer to the compound as "character impact". This means methional is the "character impact" compound of potato flavor. Other important Strecker Aldehydes that contribute to "baked potato" flavor include 3-methylbutanal (from isoleucine), 2-methylbutanal (from leucine) and phenylacetaldehyde (from phenylalanine).

When the temperature of baking increases and the moisture content drops more complex thermal reactions begin to occur. Sugars begin to dehydrate and caramelize, sulfur-containing amino acids decompose and generate hydrogen sulfide and other volatile sulfides and ammonia is released by deamidation of protein. These compounds further react into a more complex series of flavor compounds present in potato. One important class is called pyrazines. Pyrazines are compounds that begin to form at temperatures above when Strecker Aldehydes initiate. Pyrazines are responsible for toasted, nutty and roasted notes that are critical to baked potato flavor. Aside from pyrazines other nitrogen and oxygen-containing heterocyclic compounds such as pyrroles and oxazoles are produced.

A certain balance of Strecker Aldehydes and pyrazines are critical to ideal baked potato flavor. Too little of these components and the flavor will not be perceptible. Too much and the potato will have a burnt, overcooked flavor that is objectionable to most consumers. In the current study the Strecker Aldehydes and pyrazines (although all detected compounds are listed as well) have been selected as "indicator compounds" to fingerprint the optimum or "target" baked potato flavor profile.

The test results are discussed as follows:

Raw Potato, 79.2% Moisture

The flavor profile of the raw potatoes with 79.2% moisture are very low in thermal reaction products such as Strecker Aldehydes and pyrazines. Total Strecker aldehydes are only 420 µg, only a single pyrazine is detected (12 µg) and methional is barely present (16 µg). Raw potatoes have an earthy, musty and uncooked potato aroma character. The earthy, musty notes in the raw potato come from some lipid oxidation derived unsaturated aldehydes, ketones and alcohols with C8 chain lengths, the so-called mushroom aldehydes and mushroom alcohols (cis-2-octenal, trans-2-octenal, 1-octen-3-ol, etc.). Other contributors to the earthy aroma include phenolic compounds such as o-methylanisole and veratrole plus some lipid oxidation derived furans such as 2-pentylfuran that have powerful green, beany odor. The raw potatoes also have relatively high concentrations of linear paraffinic and olefinic hydrocarbons that are associated with the peel although these compounds do not impact odor much. Two compounds used for sprout control in the potatoes (SproutNip or chlorpropham and 1,2-dimethylnaphthalene) were also detected. Chlorpropham does not contribute to potato aroma and 1,2-dimethylnaphthalene has minimal contribution (slight musty).

Baked Potatoes, 75.7% Moisture (Under Baked)

The flavor profile of the baked potatoes with 75.7% moisture are distinctly different than the raw potato. The Maillard reaction compounds are beginning to appear but they are still undeveloped with respect to target baked potato aroma. The Strecker Aldehydes and pyrazines have increased to 2675 and 218 µg, respectively. A reduction in the paraffinic and olefinic hydrocarbons more prominent in the raw potatoes is observed as these compounds are lost to volatilization in the baking process and are not replenished by thermal reactions.

Baked Potatoes, 72.0% Moisture (Ideal Baked)

The flavor profile of the baked potatoes with 72.0% moisture show a complex pattern of fully developed Maillard reaction products including the Strecker Aldehydes, pyrazines and other thermally generated aroma compounds such as dicarbonyls (diacetyl, 2,3-pentanedione), pyrroles, short chain acids, sulfides and oxygen-containing heterocyclics. The levels of total Strecker Aldehydes and pyrazines have increased considerably to 6029 and 3385 µg, respectively. Sensory evaluation data indicates this particular flavor pattern to identify optimum baked potato.

Baked Potatoes, 66.0% Moisture (Over Baked)

The flavor profile of the baked potatoes with 66.0% moisture is extremely complex and indicates a burnt, overcooked flavor profile. The levels of total Strecker Aldehydes and pyrazines have increased to very high concentrations of 12199 and 59399 µg, respectively and these excessive levels contribute to the burnt, high-toast, overcooked notes associated with this product. In particular, the concentration of pyrazines has skyrocketed. Looking at the production of Strecker Aldehydes versus potato moisture content, it can be seen that the concentration rises linearly (approximately doubles with each incremental decrease in moisture content). The pyrazines behaved similarly for moisture contents in the range 79.2 through 72.0%. However, the pyrazines rise exponentially in the 66.0% moisture potatoes. This sample also shows a complex mixture of other advanced thermal reaction products not observed in the other samples.

Graph 6-1 shows baked potato flavor in terms of total Strecker Aldehydes, as determined according to this example.

Graph 6-2 shows baked potato flavor in terms of total Pyrazines, as determined according to this example.

EXAMPLE 7

This example reports an Iodine Index evaluation of potatoes baked according to the invention described in the copending application, with control samples to illustrate the Iodine Index properties of the starch in potatoes of the invention and compare them to products not optimally processed. The Iodine Index test is used to measure the free starch in a potato. Russet Norkotah potatoes contain about 20-22% solid and 78-80% water on average. About 75% of solid contents consist of starch. Potato starch is composed of Amylose and Amylopectin. Amylose is a linear polymer of glucose linked with mainly $\alpha(1\rightarrow4)$ bonds. Amylopectin is a highly branched polymer of glucose linked in a linear way with $\alpha(1\rightarrow4)$ bonds while branching takes place with $\alpha(1\rightarrow6)$ bonds occurring every 24 to 30 glucose units.

Prior to cooking, the Amylopectin is in a co-crystalline complex with the Amylose. During baking, starch structure changes. Starch cells swell by absorbing water and increase in volume. The crystalline structure degrades, that is, it can be said to melt. The granules are disrupted, and Amylose is released. The longer this thermal reaction continues, the more the outer shell of the starch particles, which have highest crystallinity index, continue to collapse. Thus, more Amylose and Amylopectin inside the outer shell melt out. Amylose's $\alpha(1\rightarrow4)$ bonds promote the formation of a helix structure or a spiral form, like a coil spring. When reacting with Iodine-KI reagent, the triiodide ion fits neatly inside the helix structure of Amylose, resulting in a blue color polymer. This blue complex absorbs wavelength of light at 570 nm, so it can be measured by spectrophotometer.

Therefore, Iodine Index is used to indicate the extent of the reaction during the baking process. Amylopectin does not react with Iodine and therefore, does not produce the color, nor does cellulose or disaccharides.

Sample Preparation:
Use Russet Norkotah variety from the same grower, field, and lot, weigh range between 5.75 and 6.25 oz, and solid range between 20.5 and 21.5%
Determine specific gravity and solids content using Brine Solution method
Bake potatoes in a forced-air convection oven set at 325 degree Fahrenheit until reaching moisture levels (calculated by weight) as mentioned above
Cut potatoes crosswise close to the center of the tuber as possible into 3-4 very thin slices, approximately 1 mm thick
Remove and discard approximately 1 cm of the outer peel layer, retaining inner portion for samples.
Cut the sample into square cubes, about 1 mm$^2$.
Weigh the sample amount as indicated in the Analytical Method below Analytical Method A standard method was used to determine Iodine Index, commonly known as "Blue Value", of raw and baked potatoes. Iodine complexes preferentially with Amylose, the linear fraction found in potato starch. When an excess of standard iodine solution is added, a stable blue complex is formed. This solution is then measured spectro-photometrically. The procedures are as follows:

Weigh out samples of potatoes that would yield 1.0 gram of solid content
Raw potatoes (% solid content of the raw potatoes used is 21.5%, equivalent to 78.5% moisture)

$$\text{Sample size} = 1.0 \text{ gram}/1-0.785$$
$$= 1.0/0.215$$
$$= 4.6 \text{ grams}$$

Baked potatoes at 75.7% moisture $$\text{Sample size} = 1.0 \text{ gram}/1-0.757$$
$$= 1.0/0.243$$
$$= 4.1 \text{ grams}$$

Baked potatoes at 72.0% moisture $$\text{Sample size} = 1.0/1-0.72$$
$$= 1.0/0.28$$
$$= 3.6 \text{ grams}$$

Baked potatoes at 66.0% moisture $$\text{Sample size} = 1.0/1-0.66$$
$$= 1.0/0.34$$
$$= 2.9 \text{ grams}$$

Pour sample into a beaker containing 250 ml of deionized water heated to 50 degree Celsius
Set a beaker containing samples and a magnetic stir bar on a heated agitator and set it to stir for 5 minutes
Pour sample solution into centrifuge tubes and centrifuge at a maximum speed (at 100 setting on Dynac Centrifuge) for 10 minutes
Transfer 10 mls of clear solution with a pipette to a 50 ml volumetric flask, containing 1 ml of 0.02 N Iodine solutions. Dilute to 50 mls with deionized water
Make a blank solution of 1 ml of 0.02 N Iodine solutions and 49 ml of deionized water in another 50 ml volumetric flask
Mix the sample well
Set the spectrophotometer to a wavelength of 570 millimicrons
Use a blank solution as a reference sample
The reading from each sample solution is the Iodine Index Analytical Procedures:

We conducted the Iodine Index tests using 20 potatoes per each set of samples. Three samples were tested for each potato. This is to ensure that natural variation within a potato and among potatoes being used is taken into considerations. A total of 60 data points are generated for each set of samples to ensure that sufficient data is generated and collected and thus provides statistically significant conclusions.

Results

The results of the Iodine Index tests with 20 potatoes for each set of samples is summarized in Graph 7-1, with each data point is an average of 3 samples tested per each potato. As shown in the graph, raw potatoes have a very low Iodine Index compared to baked potatoes. As potatoes are baked longer as indicated by more moisture being removed, the Iodine Index also increases.

An average of the Iodine Index from all 20 potatoes for each set of samples is calculated and shown in Graph 7-2.

Conclusions:

The results of average and range of Iodine Index are as follows:

TABLE 7

|  | Average | Range |
|---|---|---|
| Raw Potatoes: | 0.006 | 0.001-0.011 |
| Baked Potatoes, | 0.102 | 0.071-0.134 |
| 75.7% Moisture | 0.295 | 0.221-0.343 |
| 72.0% Moisture | 0.399 | 0.348-0.442 |
| 66.0% Moisture | | |

The sample solutions of raw potatoes form yellowish color after mixing with Iodine-KI solution. This is slightly darker compared to a reference sample containing no starch. This indicates that raw potatoes contain a very minimal amount of free starch or Amylose.

Under-baked potatoes are potatoes that are baked until reaching 75.7% moisture, which take approximately 45 to 50 minutes baking time. Some Amylose is released during baking and more Amylose-triiodide compounds are formed. Therefore, Starch-Iodide solution turns yellowish-green to light green in color, and Iodine Index increases to 0.102.

As we continued baking potatoes until reaching 72.0% moisture content, which takes about 60 to 65 minutes, more crystalline structure breaks down and more Amylose is released. Sample solutions turn green to dark green in color. Iodine Index significantly increases to 0.295.

Over baked potatoes are potatoes that are baked until reaching 66.0% moisture, which takes about 120 minutes. Highest amount of Amylose is present in the sample solutions. As potatoes are baked for a very long period of time, cell wall starts to collapse and release Amylose and water from inside the cell. Excessively soft and wet texture is very noticeable. Starch-Iodide solution turns bluish-green to dark blue in color, and Iodine Index is as high as 0.399.

The data below will provide objective measurements of textural aspects of the product by testing both the soft pulp portion and the skin or peel portion of the potatoes.

EXAMPLE 8

Texture Analysis of Baked Potatoes Vs. Pulp of Fryable Baked Potato Pieces

Objectives:
To analyze and differentiate the characteristics of internal texture (pulp) of optimally baked potatoes and fryable baked potato pieces of the invention.
Samples Analyzed:
Baked potatoes (75% moisture) of Russet Norkotah and Red potatoes
Fryable Potato Pieces potatoes of Russet Norkotah and Red potatoes
Sample Preparation:
Baked Potatoes
Russet Norkotah variety is from the same grower, field, and lot. Weight range is between 5.5 and 6.5 oz.
Red potatoes are from Pasco, Wash. Weight range is between 5.5 and 7.5 oz.
Determine % solid by using an overnight oven method.
Bake potatoes in a forced-air convection oven set at 350 degree Fahrenheit (comparable to 400 degree Fahrenheit in the full size processing oven) until reaching 74% moisture level.
Rehydrate baked potatoes with sprayed cold water for 1 minute and let it sit and equilibrate at room temperature for 5 minutes. Upon equilibration, the final moisture is around 75% with a range of 74.5-75.5%.
Flatten potatoes to ¾" thick.
Perform texture analysis on flatten potatoes where the pulp is exposed. If there is not sufficient area of exposed pulp, gently peel away the skin and perform an analysis within 5 minutes after equilibration step.
Fryable Baked Potato Pieces
Prepare baked potatoes the same way up to the point of flattening.
Peel away some of the peel or skin so that there is enough exposed pulp area for testing.
Freeze flattened potatoes in the freezer overnight or until they are well frozen.
Bake frozen flattened potatoes in a convection oven set at 375 degree Fahrenheit (comparable to 420 degree Fahrenheit in the full size processing oven) until reaching 67% moisture with a range of 66 to 68%.
Perform texture analysis within 5 minutes after baking
Analytical Method:
To be able to objectively differentiate the characteristics of internal texture between regular baked potatoes and Fryable Potato Pieces, Texture Analyzer is used. Texture Analyzer being used for this analysis is Brookfield Texture Analyzer, Model CT3 4500.
The Texture Analyzer measures the resistance of potatoes to an applied force. The force is applied through a vertical compression of a TA39, 2 mm diameter flat end stainless steel probe, which is driven through a set distance at a set speed into potato pulp. The resistance is then measured through a load cell in a unit of gram per every hundredth of a second.
Parameters for Texture Analyzer are set as follows:
The trigger point—4.5 grams (A load measured by a Texture Analyzer to indicate that the probe is in contact with the sample. Once the trigger point is reached, the test will begin until it reaches a defined distance at a defined speed.)
Test speed—2 mm/second (A speed at which the probe will travel the specified distance).
Deformation—10 mm. (The total downward distance the probe will travel once the trigger value is reached). With a 3 cm thickness of potato flats, a probe will travel for 10 mm after reaching a trigger point, which is close to a center of potatoes.
The following calculations are measured for each set of sample:
Peak Load: The maximum measured load (gram) recorded at any time during the test.
Deformation at Peak: The distance to which the sample is compressed when the peak load occurs.
Analytical Procedures:
After the samples are prepared, they are placed on the base table approximately 5 mm below the end of the probe. After the parameters are set, the testing starts as the probe travels vertically at a speed of 2 mm/second. As soon as the trigger point is reached, the load is measured as the probe penetrated for 10 mm before retracting to the original position. The final measurement of peak load and deformation at peak load are calculated.
Puncture test is done in 3 different locations of each potato. A total of 20 potatoes are used per set of samples. Therefore, 60 data points are generated for each set of samples to ensure that sufficient data is generated and collected and thus provide a statistically significant conclusion.
Results:
In order to conduct an analysis that generates significant and reliable data, we conducted tests with 20 Russet and red potatoes and 3 different puncture tests per potato for each set of samples. Therefore, 60 data points are generated per set of samples. Each value shown in Table 8-1 and Table 8-2 is an average of 3 tests done for each Russet and Red potato, respectively. Each data point from Table 8-1 is plotted and displayed in Graph 8-1. Average, minimum, and maximum values of Peak Load are plotted and displayed in Graph 8-2.

Table 8-1: Comparison of Average Peak Load of Baked Russet potatoes and Russet Fryable Baked Potato Pieces.

TABLE 8-1

| Sample Number | Average - Peak Load (gram) | |
| --- | --- | --- |
| | Baked Russet potatoes | Russet Fryable Potato Pieces |
| 1 | 120.7 | 342.0 |
| 2 | 187.7 | 321.2 |
| 3 | 65.7 | 587.7 |
| 4 | 100.5 | 395.8 |
| 5 | 156.8 | 312.7 |
| 6 | 290.8 | 459.7 |
| 7 | 233.5 | 522.2 |
| 8 | 151.7 | 433.3 |
| 9 | 76.2 | 447.8 |
| 10 | 104.0 | 531.5 |
| 11 | 148.7 | 496.7 |
| 12 | 101.5 | 501.0 |
| 13 | 188.5 | 479.8 |
| 14 | 143.3 | 400.2 |
| 15 | 127.2 | 335.2 |
| 16 | 118.5 | 347.2 |
| 17 | 110.8 | 554.7 |
| 18 | 245.0 | 432.7 |
| 19 | 137.3 | 642.5 |
| 20 | 151.8 | 492.2 |
| Average | 148.0 | 451.8 |
| Standard Deviation | 57.3 | 92.7 |
| Minimum | 65.7 | 312.7 |
| Maximum | 290.8 | 642.5 |

Based on the data in Table 8-1 and sensory evaluations, it can be said that acceptable values for Average Peak Load of Russet Fryable Baked Potato Pieces will be within the range of from about 360 grams to about 550 grams, with values of from about 430 grams to about 500 grams being preferable.

Table 8-2 presents a Comparison of Average Peak Load of Baked Red potatoes and Red Fryable Baked Potato Pieces.

TABLE 8-2

| Sample Number | Average - Peak Load (gram) | |
| --- | --- | --- |
| | Baked Red potatoes | Red Fryable Potato Pieces |
| 1 | 191.2 | 494.3 |
| 2 | 297.5 | 536.8 |
| 3 | 164.3 | 408.5 |
| 4 | 188.7 | 448.0 |
| 5 | 95.7 | 549.0 |
| 6 | 313.2 | 615.3 |
| 7 | 198.8 | 565.0 |
| 8 | 154.7 | 401.5 |
| 9 | 97.5 | 561.5 |
| 10 | 186.8 | 499.8 |
| 11 | 154.5 | 427.5 |
| 12 | 172.2 | 388.3 |
| 13 | 154.2 | 420.3 |
| 14 | 149.2 | 424.3 |
| 15 | 284.0 | 524.2 |
| 16 | 275.0 | 349.8 |
| 17 | 176.3 | 517.8 |
| 18 | 306.3 | 379.0 |
| 19 | 168.8 | 452.5 |
| 20 | 288.2 | 362.0 |
| Average | 200.9 | 466.3 |
| Standard Deviation | 68.1 | 76.9 |
| Minimum | 95.7 | 349.8 |
| Maximum | 313.2 | 615.3 |

Based on the data in Table 8-2 and sensory evaluations, it can be said that acceptable values for Average Peak Load of Red Fryable Baked Potato Pieces will be within the range of from about 390 grams to about 550 grams, with values of from about 420 grams to about 520 grams being preferable.

Each data point in Table 8-2 is plotted and displayed in Graph 8-3. Average, minimum, and maximum values of peak load are plotted and displayed in Graph 8-4.

In addition to Peak Load measurement, we also measured the distance where the peak load is achieved, called Deformation at Peak Load as displayed in Table 8-3. Each data point is plotted and displayed in Graph 8-5. Average, minimum, and maximum values of Deformation at Peak Load are plotted and displayed in Graph 8-6.

Table 8-3: Comparison of Deformation at Peak Load of Baked Russet potatoes and Russet Fryable Potato Pieces.

TABLE 8-3

| Sample Number | Average - Deformation at Peak Load (mm) | |
| --- | --- | --- |
| | Baked Russet Potatoes | Russet Fryable Potato Pieces |
| 1 | 1.7 | 4.5 |
| 2 | 2.4 | 4.4 |
| 3 | 3.0 | 5.3 |
| 4 | 2.7 | 3.4 |
| 5 | 2.8 | 3.7 |
| 6 | 2.6 | 4.8 |
| 7 | 3.2 | 4.1 |
| 8 | 2.4 | 4.3 |
| 9 | 1.9 | 3.2 |
| 10 | 2.7 | 5.1 |
| 11 | 3.5 | 4.4 |
| 12 | 2.1 | 5.1 |
| 13 | 2.4 | 4.3 |
| 14 | 2.1 | 4.4 |
| 15 | 2.1 | 5.1 |
| 16 | 2.6 | 3.6 |
| 17 | 2.8 | 5.5 |
| 18 | 2.4 | 5.4 |
| 19 | 2.3 | 6.6 |
| 20 | 5.4 | 3.2 |
| Average | 2.7 | 4.5 |
| Standard Deviation | 0.8 | 0.9 |
| Minimum | 1.7 | 3.2 |
| Maximum | 5.4 | 6.6 |

Based on the data in Table 8-3 and sensory evaluations, it can be said that acceptable values for Average Deformation at Peak Load of Russet Fryable Baked Potato Pieces will be within the range of from about 3.6 mm to about 5.4 mm, with values of from about 4.3 mm to about 5.1 mm being preferable.

Table 8-4 is Comparison of Deformation at Peak Load of Baked Red potatoes and Red Fryable Baked Potato Pieces. Each data point is plotted and displayed in Graph 8-7. Average, minimum, and maximum of Deformation at Peak Load are plotted and displayed in Graph 8-8.

TABLE 8-4

| Sample Number | Average - Deformation at Peak Load (mm) | |
|---|---|---|
| | Baked Red Potatoes | Red Fryable Baked Potato Pieces |
| 1 | 3.1 | 3.5 |
| 2 | 4.5 | 4.7 |
| 3 | 2.9 | 4.2 |
| 4 | 5.3 | 3.0 |
| 5 | 2.5 | 5.7 |
| 6 | 3.9 | 4.7 |
| 7 | 4.1 | 3.7 |
| 8 | 2.8 | 3.5 |
| 9 | 4.1 | 4.8 |
| 10 | 3.6 | 3.4 |
| 11 | 2.9 | 4.9 |
| 12 | 3.1 | 4.9 |
| 13 | 3.2 | 4.2 |
| 14 | 3.1 | 3.4 |
| 15 | 4.1 | 4.3 |
| 16 | 4.1 | 4.0 |
| 17 | 5.8 | 3.6 |
| 18 | 3.7 | 3.3 |
| 19 | 3.7 | 4.5 |
| 20 | 3.8 | 4.0 |
| Average | 3.7 | 4.1 |
| Standard Deviation | 0.8 | 0.7 |
| Minimum | 2.5 | 3.0 |
| Maximum | 5.8 | 5.7 |

Based on the data in Table 8-4 and sensory evaluations, it can be said that acceptable values for Average Deformation at Peak Load of Red Fryable Baked Potato Pieces will be within the range of from about 3.4 mm to about 4.8 mm.

Conclusions Regarding Pulp Testing

According to Table 8-1, the results of average, minimum, and maximum peak loads of Russet variety are as follows:

Baked Russet: 148.0 grams, minimum 65.7 grams, maximum 290.8 grams

Russet Fryable Baked Potato Pieces: 451.8 grams, minimum 312.7 grams, maximum 642.5 grams According to Table 8-2, the results of average, minimum, and maximum peak load of Red variety are as follows:

Baked Red: 200.9 grams, minimum 95.7 grams, maximum 313.2 grams

Red Fryable Baked Potato Pieces: 466.3 grams, minimum 349.8 grams, maximum 615.3 grams According to the results above, there are significant differences of resistance or force required to penetrate through potato pulp between regular baked potatoes and Fryable Potato Pieces in both varieties. Fryable Baked Potato Pieces require much more force of penetration, compared to regular baked potatoes. The same conclusion is drawn for both Russet and Red varieties although the results show that a Red variety requires more force than Russet variety in both regular baked and Fryable Baked Potato Pieces applications. While not wishing to be bound by theory, we believe it is possible that a higher ratio of Amylopectin in a Red variety contributes to this result as Amylopection has more complex molecular structure than Amylose that is more prevalent in a Russet variety.

According to Graph 8-1, 8-2, 8-3, and 8-4, all samples also show apparent trends of higher Peak Load values in Fryable Baked Potato Pieces than in regular baked potatoes.

Besides testing for Peak Load, we also measured deformation at peak load in order to confirm the results and yield a more valid conclusion.

According to Table 8-3, the results of average, minimum, and maximum deformation at peak load of Russet variety are as follows:

Baked Russet: 2.7 mm, minimum 1.7 mm, maximum 5.4 mm

Russet Fryable Baked Potato Pieces: 4.5 mm, minimum 3.2 mm, maximum 6.6 mm

According to Table 8-4, the results of average, minimum, and maximum deformation at peak load of Red variety are as follows:

Baked Red: 3.7 mm, minimum 2.5 mm, maximum 5.8 mm

Red Fryable Baked Potato Pieces: 4.1 mm, minimum 3.0 mm, maximum 5.7 mm

According to the results above, there are significant differences of distance where the peak load is measured between regular baked potatoes and Fryable Baked Potato Pieces. Peak load is obviously measured at a deeper distance on Fryable Baked Potato Pieces than regular bakes.

According to Graph 8-5, 8-6, 8-7, and 8-8, all samples show higher trend of deformation at peak load in Fryable Baked Potato Pieces than in regular baked potatoes even though the trend on a Red variety is not as obvious as those on a Russet variety.

As frozen baked potatoes are re-baked at a very high temperature (360-420 degree Fahrenheit in a full size production, depending on potato varieties), ice crystal is turned into liquid, water then rapidly evaporates from the surface while water underneath moves toward the surface. Under optimally controlled temperature, evaporation on the surface occurs at the same rate as the movement of water from the center toward the surface. However, with excessively high heat applied, the rate of evaporation at potato surfaces are much higher than the rate of those moving from the center to the surface; therefore, a capillary action is interrupted meaning the cells at the surface close up and prevent the escape of moisture from the inside. As heat continues to be applied to potato pieces, dry cells on potato surfaces become harder and dryer. The longer potato pieces are exposed to high heat, the dryer the surface. The objectives of creating dry and tough outer skin while maintaining internal moist texture are achieved by high heat application. The products then can be tolerated by a more aggressive way of cooking, such as deep frying, stir frying, or grilling while still maintaining ideal internal baked potatoes flavors and texture whereas regular baked potatoes will simply disintegrated during the cooking methods just mentioned.

The objective results from Texture Analysis support our subjective sensory evaluation between the pulp portions of regular baked potatoes and Fryable Baked Potato Pieces potatoes.

EXAMPLE 9

Texture Analysis of Baked Potatoes vs. Fryable Baked Potato Pieces Peel

Objectives

To analyze and differentiate the characteristics of peel of optimally baked potatoes and of Fryable Baked Potato Pieces.

Samples Analyzed:

Baked potatoes (75% moisture) of Russet Norkotah and Red potatoes

Fryable Baked Potato Pieces of Russet Norkotah and Red potatoes

Sample Preparation:

Baked Potatoes

Russet Norkotah variety is from the same grower, field, and lot. Weight range is between 5.5 and 6.5 oz.

Red potatoes are from Pasco, Wash. Weight range is between 5.5 and 7.5 oz.

Determine % solid by using an overnight oven method.

Bake potatoes in a forced-air convection oven set at 350 degree Fahrenheit (comparable to 400 degree Fahrenheit in the full size processing oven) until reaching 74% moisture level.

Rehydrate baked potatoes with sprayed cold water for 1 minute and let it sit and equilibrate at room temperature for 5 minutes. Upon equilibration, the final moisture is around 75% with a range of 74.5-75.5%.

Flatten potatoes to ¾" thick.

Perform texture analysis on flatten potatoes through the peel area within 5 minutes after equilibration step.

Fryable Baked Potato Pieces

Prepare baked potatoes the same way up to the point of flattening.

Freeze flattened potatoes in the freezer overnight or until they are well frozen.

Bake frozen flattened potatoes in a convection oven set at 375 degree Fahrenheit (comparable to 420 degree Fahrenheit in the full size processing oven) until reaching 67% moisture with a range of 66 to 68%.

Perform texture analysis within 5 minutes after baking

Analytical Method:

To be able to objectively differentiate the characteristics of potato peel between regular baked potatoes and Fryable Potato Pieces potatoes, Texture Analyzer is used. Texture Analyzer being used for this analysis is Brookfield Texture Analyzer, Model CT3 4500. The equipment was calibrated and certified for accuracy.

The Texture Analyzer measures the resistance of potatoes to an applied force. The force is applied through a vertical compression of a TA39, 2 mm diameter flat end stainless steel probe, which is driven through a set distance at a set speed into the potato. The resistance is then measured through a load cell in a unit of gram per every hundredth of a second.

Parameters for Texture Analyzer are set as follows:

The trigger point—4.5 grams (A load measured by a Texture Analyzer to indicate that the probe is in contact with the sample. Once the trigger point is reached, the test will begin until it reaches a defined distance at a defined speed.)

Test speed—2 mm/second (A speed at which the probe will travel the specified distance).

Deformation—10 mm. (The total downward distance the probe will travel once the trigger value is reached). With a 3 cm thickness of potato flats, a probe will travel for 10 mm after reaching a trigger point, with the final probe depth close to the center of potatoes.

The following calculations are measured for each set of sample:

Peak Load: The maximum measured load (gram) recorded at any time during the test.

Deformation at Peak: The distance to which the sample is compressed when the peak load occurs.

Analytical Procedures:

After the samples are prepared, they are placed on the base table approximately 5 mm below the end of the probe. After the parameters are set, the testing starts as the probe travels vertically at a speed of 2 mm/second. As soon as the trigger point is reached, the load is measured as the probe penetrated for 10 mm before retracting to the original position. The final measurement of peak load and deformation at peak load are calculated.

Puncture test is done in 3 different locations of each potato. A total of 20 potatoes are used per set of samples. Therefore, 60 data points are generated for each set of samples to ensure that sufficient data is generated and collected and thus provide a statistically significant conclusion.

Results:

In order to conduct an analysis that generates significant and reliable data, we conducted tests with 20 Russet and red potatoes and 3 different puncture tests per potato for each set of samples. Therefore, 60 data points are generated per set of samples. Each value shown in Table 9-1 and Table 9-2 is an average of 3 tests done for each Russet and Red potato, respectively.

Table 9-1: Comparison of Average Peak Load of Baked Russet potatoes and Russet Fryable Baked Potato Pieces. Each data point from Table 9-1 is plotted and displayed in Graph 9-1. Average, minimum, and maximum values of Peak Load are plotted and displayed in Graph 9-2.

TABLE 9-1

| Sample Number | Average - Peak Load Peels (gram) | |
|---|---|---|
| | Baked Russet potatoes | Russet Fryable Potato Pieces |
| 1 | 290.2 | 871.8 |
| 2 | 701.7 | 741.5 |
| 3 | 552.3 | 625.8 |
| 4 | 784.3 | 620.2 |
| 5 | 301.0 | 599.8 |
| 6 | 513.5 | 480.8 |
| 7 | 210.3 | 454.3 |
| 8 | 376.7 | 538.8 |
| 9 | 387.5 | 458.8 |
| 10 | 256.5 | 606.8 |
| 11 | 320.3 | 510.3 |
| 12 | 567.0 | 675.8 |
| 13 | 518.7 | 620.3 |
| 14 | 587.2 | 463.8 |
| 15 | 369.3 | 515.0 |
| 16 | 281.5 | 783.3 |
| 17 | 719.8 | 551.3 |
| 18 | 687.7 | 671.3 |
| 19 | 406.8 | 515.3 |
| 20 | 343.5 | 439.5 |
| Average | 458.8 | 587.3 |
| Standard Deviation | 173.4 | 118.1 |
| Minimum | 210.3 | 439.5 |
| Maximum | 784.3 | 871.8 |

Based on the data in Table 9-1 and sensory evaluations, it can be said that acceptable values for Average Peak Load of Peels of Russet Fryable Baked Potato Pieces will be within the range of from about 470 grams to about 710 grams, with values of from about 500 grams to about 630 grams being preferable.

Table 9-2 is a Comparison of Average Peak Load of Baked Red potatoes and Red Fryable Potato Pieces. Each data point is plotted and displayed in Graph 9-3. Average, minimum, and maximum values of peak load are plotted and displayed in Graph 9-4.

TABLE 9-2

| Sample Number | Average - Peak Load, Peels (gram) | |
|---|---|---|
| | Baked Red potatoes | Red Fryable Potato Pieces |
| 1 | 358.7 | 608.8 |
| 2 | 644.0 | 654.5 |
| 3 | 644.0 | 474.3 |
| 4 | 324.2 | 648.3 |

TABLE 9-2-continued

| Sample Number | Average - Peak Load, Peels (gram) | |
|---|---|---|
| | Baked Red potatoes | Red Fryable Potato Pieces |
| 5 | 557.2 | 552.2 |
| 6 | 572.3 | 391.3 |
| 7 | 552.2 | 708.8 |
| 8 | 309.2 | 657.8 |
| 9 | 392.0 | 496.5 |
| 10 | 260.3 | 519.8 |
| 11 | 295.8 | 604.8 |
| 12 | 572.3 | 630.2 |
| 13 | 383.3 | 384.2 |
| 14 | 569.2 | 557.8 |
| 15 | 375.3 | 678.3 |
| 16 | 843.0 | 502.5 |
| 17 | 422.3 | 391.8 |
| 18 | 498.2 | 375.2 |
| 19 | 513.2 | 434.3 |
| 20 | 687.5 | 486.7 |
| Average | 488.7 | 537.9 |
| Standard Deviation | 153.3 | 107.9 |
| Minimum | 260.3 | 375.2 |
| Maximum | 843.0 | 708.8 |

Based on the data in Table 9-2 and sensory evaluations, it can be said that acceptable values for Average Peak Load of Peels of Red Fryable Baked Potato Pieces will be within the range of from about 430 grams to about 650 grams, with values of from about 470 grams to about 610 grams being preferable.

In addition to Peak Load measurement, we also measured the distance where the peak load is achieved, called Deformation at Peak Load as displayed in Table 9-3.

Table 9-3 presents data giving a Comparison of Deformation at Peak Load of Baked Russet potatoes and Russet Fryable Potato Pieces. Each data point is plotted and displayed in Graph 9-5. Average, minimum, and maximum values of Deformation at Peak Load are plotted and displayed in Graph 9-6.

TABLE 9-3

| Sample Number | Average - Deformation at Peak Load, Peels (mm) | |
|---|---|---|
| | Baked Russet Potatoes | Russet Fryable Potato Pieces |
| 1 | 3.6 | 6.6 |
| 2 | 6.1 | 8.2 |
| 3 | 7.1 | 4.8 |
| 4 | 5.7 | 6.1 |
| 5 | 3.1 | 5.6 |
| 6 | 5.7 | 5.1 |
| 7 | 3.3 | 6.8 |
| 8 | 4.5 | 8.2 |
| 9 | 3.9 | 6.9 |
| 10 | 3.2 | 6.9 |
| 11 | 3.6 | 3.4 |
| 12 | 5.4 | 6.9 |
| 13 | 5.3 | 3.9 |
| 14 | 4.6 | 6.2 |
| 15 | 4.6 | 6.2 |
| 16 | 4.0 | 6.6 |
| 17 | 7.5 | 4.3 |
| 18 | 5.1 | 6.3 |
| 19 | 4.3 | 8.2 |
| 20 | 3.7 | 4.5 |
| Average | 4.7 | 6.1 |
| Standard Deviation | 1.3 | 1.4 |
| Minimum | 3.1 | 3.4 |
| Maximum | 7.5 | 8.2 |

Based on the data in Table 9-3 and sensory evaluations, it can be said that acceptable values for Average Deformation at Peak Load of Peels of Russet Fryable Baked Potato Pieces will be within the range of from about 4.7 mm to about 7.5 mm, with values of from about 6.1 mm to about 6.9 mm being preferable.

Table 9-4 presents data giving a Comparison of Deformation at Peak Load of Baked Red potatoes and Red Fryable Potato Pieces. Each data point is plotted and displayed in Graph 9-7. Average, minimum, and maximum of Deformation at Peak Load are plotted and displayed in Graph 9-8.

TABLE 9-4

| Sample Number | Average - Deformation at Peak Load (mm) | |
|---|---|---|
| | Baked Red Potatoes | Red Fryable Potato Pieces |
| 1 | 5.2 | 7.3 |
| 2 | 7.1 | 6.6 |
| 3 | 7.1 | 7.0 |
| 4 | 5.3 | 8.4 |
| 5 | 7.5 | 6.8 |
| 6 | 7.6 | 5.9 |
| 7 | 8.1 | 9.2 |
| 8 | 5.2 | 7.6 |
| 9 | 6.4 | 8.6 |
| 10 | 5.8 | 6.9 |
| 11 | 4.3 | 3.5 |
| 12 | 8.1 | 5.5 |
| 13 | 6.3 | 5.2 |
| 14 | 8.6 | 6.2 |
| 15 | 5.6 | 9.2 |
| 16 | 7.7 | 9.0 |
| 17 | 5.5 | 4.4 |
| 18 | 5.1 | 3.5 |
| 19 | 8.7 | 3.4 |
| 20 | 8.1 | 6.3 |
| Average | 6.7 | 6.5 |
| Standard Deviation | 1.3 | 1.9 |
| Minimum | 4.3 | 3.4 |
| Maximum | 8.7 | 9.2 |

Based on the data in Table 9-4 and sensory evaluations, it can be said that acceptable values for Average Deformation at Peak Load of Peels of Red Fryable Baked Potato Pieces will be within the range of from about 4.6 mm to about 8.4 mm, with values of from about 5.9 mm to about 7.6 mm being preferable Conclusions:

According to Table 9-1, the results of average, minimum, and maximum peak loads of Russet variety are as follows:

Baked Russet: 458.8 grams, minimum 210.3 grams, maximum 784.3 grams

Russet Fryable Potato Pieces: 587.3 grams, minimum 439.5 grams, maximum 871.8 grams According to Table 9-2, the results of average, minimum, and maximum peak load of Red variety are as follows:

Baked Red: 488.7 grams, minimum 260.3 grams, maximum 843.0 grams

Red Fryable Potato Pieces: 537.9 grams, minimum 375.2 grams, maximum 708.8 grams According to the results above, there are significant differences of resistance or force required to penetrate through potato peel between regular baked potatoes and Fryable Potato Pieces in both varieties. Fryable Potato Pieces require more force of penetration, compared to regular baked potatoes. The same conclusion is drawn for both Russet and Red varieties. However, the results show that there is no significant difference of force required between Russet and Red varieties, unlike pulp analysis.

According to Graphs 9-1, 9-2, 9-3, and 9-4, all samples also show trends of higher Peak Load values in Fryable Potato Pieces than in regular baked potatoes although not as significant as those measured on pulp.

Peel of Fryable Potato Pieces potatoes are dryer and tougher as moisture is removed from the surface during baking process; therefore, they can tolerate more abuse during cooking on the grills, deep fryers, or cooking pans, compared to regular baked potatoes. This is shown by higher values of peak loads or more force to penetrate through the peel.

Besides testing for Peak Load, we also measured deformation at peak load in order to confirm the results and yield a more valid conclusion.

According to Table 9-3, the results of average, minimum, and maximum deformation at peak load of Russet variety are as follows:

Baked Russet: 4.7 mm, minimum 3.1 mm, maximum 7.5 mm

Russet Fryable Potato Pieces: 6.1 mm, minimum 3.4 mm, maximum 8.2 mm

According to Table 9-4, the results of average, minimum, and maximum deformation at peak load of Red variety are as follows:

Baked Red: 6.7 mm, minimum 4.3 mm, maximum 8.7 mm

Red Fryable Potato Pieces: 6.5 mm, minimum 3.4 mm, maximum 9.2 mm

According to the results above for Russet variety, there are significant differences of distance where the peak load is measured between regular baked potatoes and Fryable Potato Pieces. Peak load is obviously measured at a deeper distance on Fryable Potato Pieces than regular bakes. However, there is no significant difference of deformation at peak load in Red variety. Due to natural variation of potato peel and some skin defect, peel could be hard and tough but also brittle, which result in high peak load but low deformation in Red variety.

According to Graph 9-5 and 9-6, all samples show higher trend of deformation at peak load in Fryable Potato Pieces than in regular baked potatoes while the trend on a Red variety is not as obvious as those on a Russet variety.

As frozen baked potatoes are re-baked at a very high temperature (360-420 degree Fahrenheit in a full size production, depending on potato varieties), ice crystal is turned into liquid, water then rapidly evaporates from the surface while water underneath moves toward the surface. Under optimally controlled temperature, evaporation on the surface occurs at the same rate as the movement of water from the center toward the surface. However, with excessively high heat applied, the rate of evaporation at potato surfaces are much higher than the rate of those moving from the center to the surface; therefore, a capillary action is interrupted meaning the cells at the surface close up and prevent the escape of moisture from the inside. As heat continues to be applied to potato pieces, dry cells on potato surfaces and peel become harder and dryer. The longer potato pieces are exposed to high heat, the dryer the surface. The objectives of creating dry and tough outer skin while maintaining internal moist texture are achieved by high heat application. The products then can be more tolerant to a more aggressive way of cooking, such as deep frying, stir frying, or grilling while still maintaining ideal internal baked potatoes flavors and texture whereas regular baked potatoes will simply disintegrate during the cooking methods just mentioned.

The objective results from Texture Analysis support our subjective sensory evaluation between regular baked potatoes and Fryable Potato Pieces. Water loss from the surface during additional baking process creates hard and tough skin of pulp and peel and provides nicely crisp external texture of the Fryable Potato Pieces upon final cooking that are favorable, compared to regular baked potatoes.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence which is effective to meet the objectives there intended, unless the context specifically indicates the contrary.

What is claimed is:

1. A process for preparing potatoes for final cooking to produce a fried baked potato product that retains baked potato flavor and aroma during frozen storage, wherein a majority of potato skin in the product is attached to baked potato pulp, comprising:

baking potatoes having skin and pulp portions, wherein the baked pulp exhibits an Iodine Index within the range of from about 0.2 to about 0.4;

rehydrating the baked potato, following rehydration and prior to breaking, pressing the baked potatoes to uniformly reduce their thickness to within the range of from about 0.5 to about 1.5 inches;

freezing the potatoes;

breaking the baked potatoes into discrete pieces having a size within the range of from 0.5 to 1.5 inches, wherein potato skin is attached to baked potato pulp;

drying the discrete pieces to form a skin on the potato pulp portion;

frying the discrete pieces in hot vegetable oil to enhance the color and flavor of the skin on the pulp portion; and freezing and packaging the discrete pieces of baked potato under frozen conditions to maintain a flowable characteristic wherein potato skin is attached to baked potato pulp.

2. A process according to claim 1, wherein drying the discrete pieces is effected in an oven sufficiently to color the surfaces from golden to golden brown.

3. A process according to claim 1, wherein the step of drying the discrete pieces reduces the moisture content to within the range of from about 66 to 70% by weight of the product at this stage in processing.

4. A process according to claim 1, which includes the further step of spraying with vegetable oil.

\* \* \* \* \*